United States Patent [19]

Cloonan et al.

[11] Patent Number: 5,172,259

[45] Date of Patent: Dec. 15, 1992

[54] EMBEDDED CONTROL NETWORK

[75] Inventors: Thomas J. Cloonan, Downers Grove, Ill.; John R. Erickson, Grover, Mo.; Anthony L. Lentine, St. Charles, Ill.; Frederick B. McCormick, Jr.; Gaylord W. Richards, both of Lisle, Ill.

[73] Assignee: AT&T Laboratories, Murray Hill, N.J.

[21] Appl. No.: 661,762

[22] Filed: Feb. 27, 1991

[51] Int. Cl.⁵ .................................... H04J 14/08
[52] U.S. Cl. ................................ 359/139; 385/16; 359/135
[58] Field of Search ............... 359/108, 117, 118, 127, 359/128, 139, 86, 42; 385/16, 17

[56] References Cited

U.S. PATENT DOCUMENTS

| | | | |
|---|---|---|---|
| 4,494,230 | 1/1985 | Turner | 370/60 |
| 4,739,520 | 4/1988 | Collins, Jr. et al. | 455/600 |
| 4,751,378 | 1/1988 | Hinton et al. | 377/102 |
| 4,914,648 | 5/1990 | Acampora et al. | 359/125 |
| 4,917,456 | 5/1990 | Jahns et al. | 359/109 |
| 4,952,791 | 8/1990 | Hinton et al. | 377/102 |
| 4,959,534 | 9/1990 | Lentine et al. | 377/102 |
| 4,967,068 | 10/1990 | Lentine et al. | 377/102 |
| 5,023,864 | 6/1991 | Cloonan et al. | 359/115 |
| 5,077,483 | 12/1991 | Cloonan et al. | 359/135 |

OTHER PUBLICATIONS

A. Huang et al., "Starlite: A Wideband Digital Switch," *IEEE Global Telecommunications Conference*, vol. 1, Nov. 26-29, 1984, p. 121.

*Primary Examiner*—Edward L. Coles, Sr.
*Assistant Examiner*—Rafael Bacares
*Attorney, Agent, or Firm*—R. T. Watland; D. L. Hurewitz

[57] ABSTRACT

A network comprising a plurality of successively interconnected node stages where each node has an associated data connection state and includes a control element, significantly implemented as part of the node itself, for controlling the data connection state of at least one node of the following stage. The network is well suited for optical implementation and is controlled by shifting bits into the network for storage by the control elements rather than relying on spatial light modulators.

18 Claims, 45 Drawing Sheets

PHOTONIC SYSTEM 10

OPTICAL HARDWARE MODULE

S-SEED ARRAY

OPTICAL CROSSOVER INTERCONNECT
(HORIZONTAL)

OPTICAL CROSSOVER INTERCONNECT
(VERTICAL)

OPTICAL CROSSOVER INTERCONNECT
(INTRA-NODE)

PERFECT SHUFFLE
EQUIVALENT NETWORK

3 CONSECUTIVE
OPTICAL HARDWARE
MODULES

3-DIMENSIONAL
CROSSOVER
NETWORK

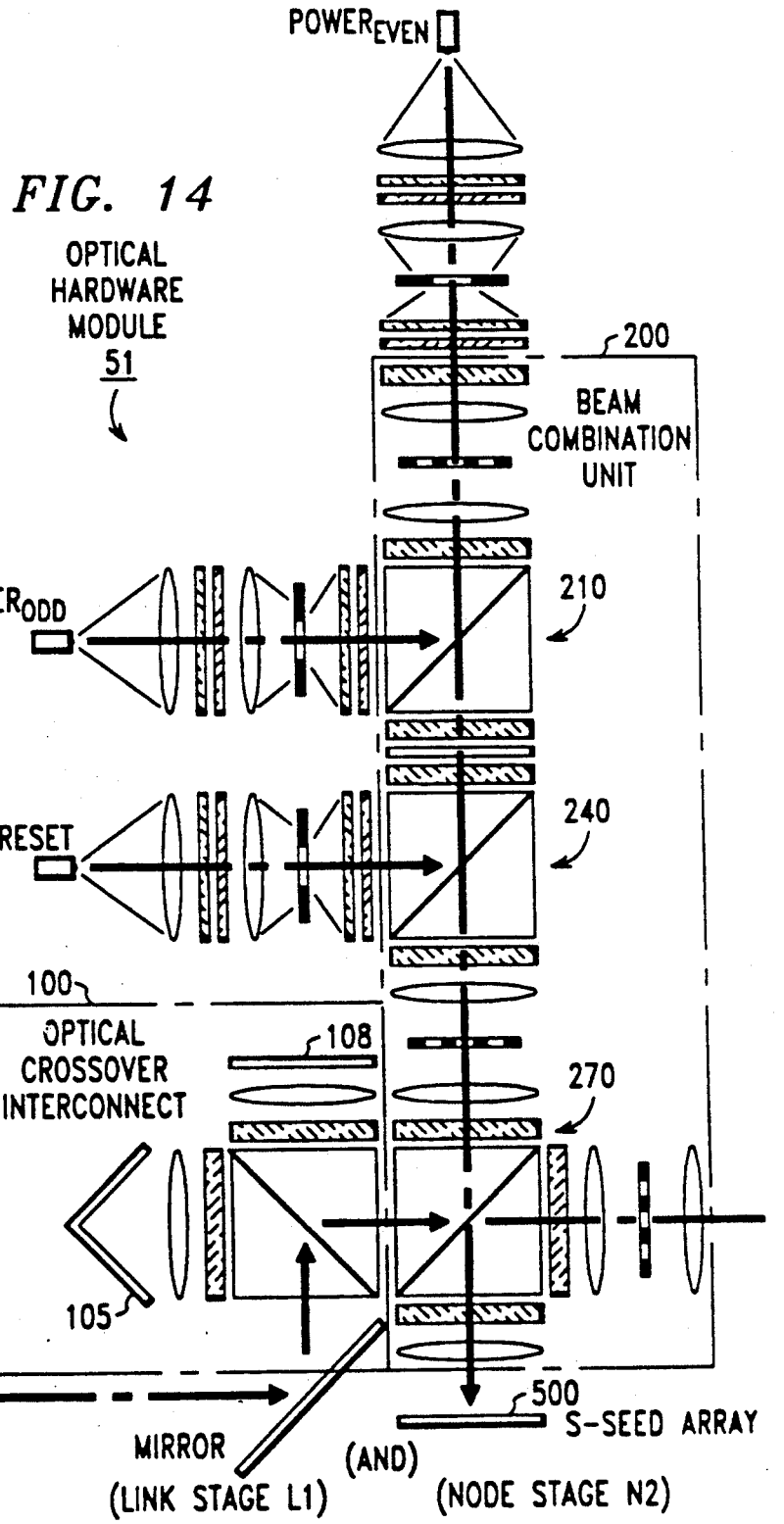

OPTICAL HARDWARE MODULE 51'

OPTICAL HARDWARE MODULE 52

PERFECT SHUFFLE EQUIVALENT NETWORK

CROSSOVER INPLEMENTATION

SHUFFLE INPLEMENTATION

2D IMPLEMENTATION

3D IMPLEMENTATION

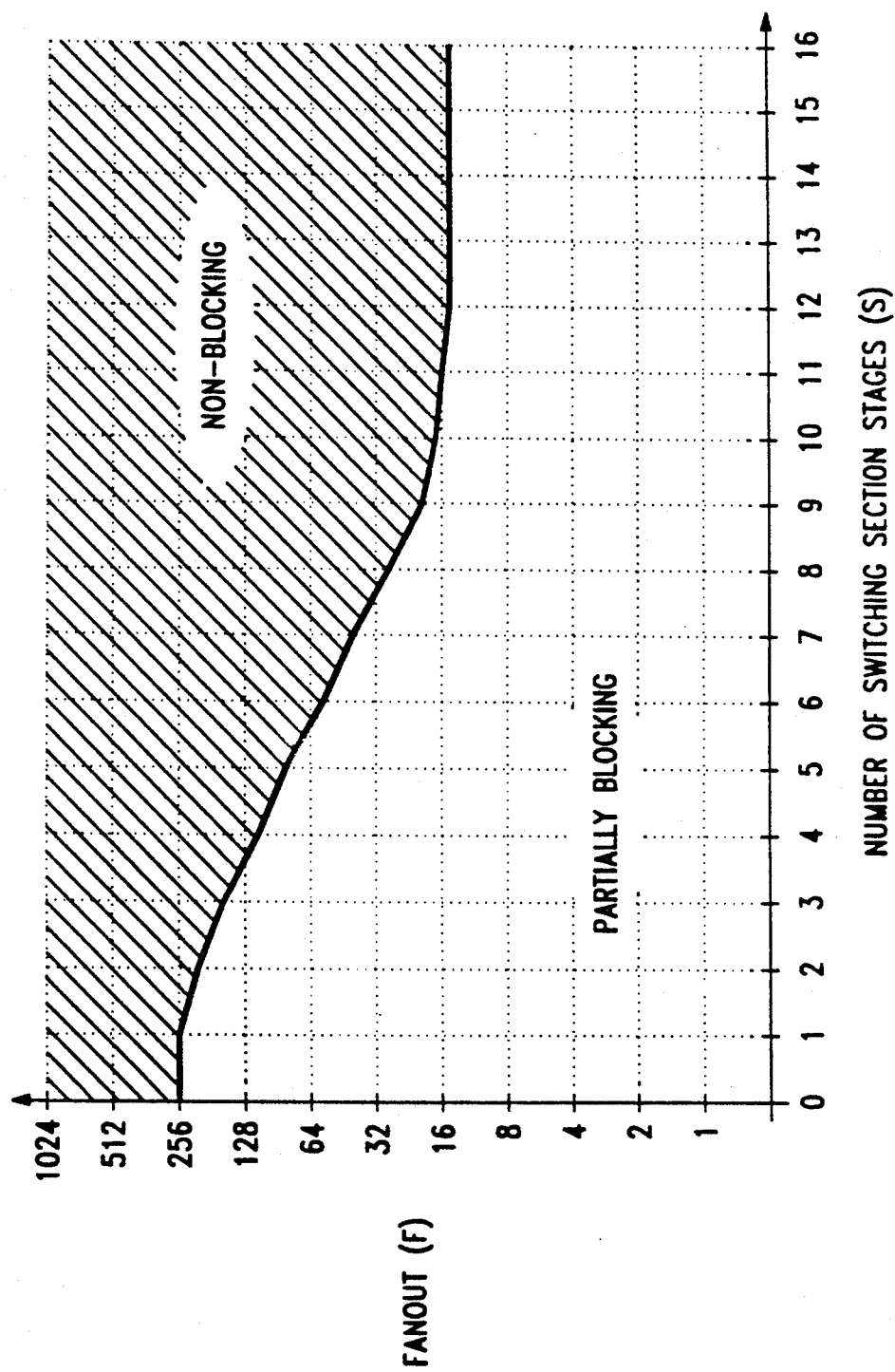

SMALL F, LARGE S

LARGE F, SMALL S

OPTICAL IMPLEMENTATION OF (2,1,1) NODE

5,172,259

EMBEDDED CONTROL NETWORK

CROSS-REFERENCE TO RELATED APPLICATION

This application is related to the following application, which is assigned to the same assignee and concurrently filed herewith:

T. J. Cloonan et al., Case 6-12-6-18, "Network Control Arrangement" Ser. No. 07/661,790, filed Feb. 27, 1991.

TECHNICAL FIELD

This invention relates to networks for information processing and switching.

BACKGROUND AND PROBLEM

The Extended Generalized Shuffle (EGS) class of networks permits very flexible system design while yielding low blocking probabilities and high degrees of fault tolerance. Known optical EGS network designs, for example, the photonic system disclosed in the (Cloonan et al. U.S. application Ser. No. 07/349,008 now U.S. Pat. No. 5,023,864, issued Jun. 11, 1991, incorporated by reference herein, and in the published European patent application 90304731.4, use three-dimensional interconnections between two-dimensional arrays of optical logic devices, such as symmetric self electro-optic effect devices (S-SEEDs). These optical logic devices can be operated as AND, OR, NAND, and NOR gates, as well as S-R latches. The optical interconnections between the devices on consecutive arrays are provided by bulk, free space optical elements, such as lenses, beam-splitters, and mirrored gratings. It has been shown that these passive optical elements can be used to provide crossover interconnections between stages of nodes. The known optical EGS designs have limitations due to their reliance on spatial light modulators (SLMs) to effect network control. A SLM is an array of windows (or pixels) that can be made transparent or opaque based on the electronic control signals that are directed to it. In the known optical EGS designs, path hunt processing is performed in an external electronic centralized controller and the results of path hunt processing are transmitted to the optical switching nodes within the network (FIG. 21). The transformation of the electronic control signals in the centralized controller into the optical control signals within the network is performed by the SLMs. Unfortunately, presently available SLM technologies have relatively slow switching times (on the order of microsecond switching). Some of the available SLMs are also inefficient in terms of their output power to input power ratios. Slow switching times make high-speed time-multiplexed switching (TMS) operations (shown in FIG. 22) impractical, and inefficient power utilization limits the achievable system data rates. In addition, the use of SLMs complicates the optical hardware and the opto-mechanics required in the known designs. It is clear, therefore that an optical EGS network that does not require the use of SLMs for network control would have many benefits.

In an optical implementation of a self-routing Starlite packet switch described in A. Huang and S. Knauer, "Starlite: A Wideband Digital Switch," GlobeCom '84, (IEEE 84CH2064-4)(November 1984), Vol. 1, p. 121, network control is accomplished without the use of SLMs by distributing the path hunt processing operations within small processors attached to each of the switching nodes within the Starlite network (FIG. 23), and prepending routing information to the transmitted data so that routing information is made available to each switching node that receives the data. Although each of the distributed processors is much simpler than the centralized controller used in the known optical EGS designs, the inclusion of a processor within each node complicates the hardware requirements for a single node substantially. In fact, whereas a single node in the optical EGS network requires at most four S-SEEDs, a comparable node in the optical Starlite network requires as many as 128 S-SEEDs. Although the operation of a large number of S-SEEDs may become practical in the future, this increase in hardware cost is not presently justified by the benefits associated with the use of optics for network interconnections. As a result, a need exists for a cost-effective optical switching architecture that is not burdened by the operational limitations of present-day SLMs.

Solution

This need is met and a technical advance is achieved in accordance with the principles of the invention in an exemplary network comprising a plurality of successively interconnected node stages where each node has an associated data connection state and includes a control element, significantly implemented as part of the node itself, for controlling the data connection state of at least one node of the following stage. The network is well suited for optical implementation and is controlled by shifting bits into the network for storage by the control elements rather than relying on spatial light modulators.

A network in accordance with the invention comprises a plurality of successively interconnected node stages where each node has an associated data connection state and each node of at least one of the stages includes a control storage element for controlling the data connection state of at least one node of the following stage.

Illustratively, each node has two data inputs, two control inputs, a control output, and a data output, where each control input is associated with one data input. The network includes optical crossover interconnects that connect each data output of one node stage to two data inputs of the following node stage and connect each control output of the one node stage to two control inputs of the following node stage. Each control output of the one node stage is usable to selectively enable the transmission of data receivable from one of the data outputs of the one node stage through only one of the two nodes of the following node stage that have their data inputs connected to the one data output of the one node stage (FIG. 49).

Control signals are applied to the node data inputs to properly set the control storage element of the node before any data signals are applied to the node data inputs.

The node performs a logic function the same as or logically equivalent to the function performed by a circuit comprising first and second AND gates and first and second OR gates. The output of each of the first and second AND gates is connected to an input of both of the first and second OR gates. The first AND gate has as inputs one data input and its associated control input and the second AND gate has as inputs the other data input and its associated control input. The output of the first OR gate is connected via a flip-flop as the control output of the node. The output of the second OR gate is the data output of the node.

An optical implementation of the node comprises four symmetric self electro-optic effect devices. The first and second devices are optically connected via an optical crossover interconnect to the third and fourth devices. Consecutive node stages are also optically connected via an optical crossover interconnect. The node may also be implemented electrically.

A system in accordance with the invention comprises a plurality of stages of nodes, each node having at least two inputs and at least two outputs, where the number of node stages is at least three. The system further includes a plurality of stages of links for connecting the outputs of one of the node stages to the inputs of the successive one of the node stages. The node stages and the link stages collectively comprise a perfect shuffle equivalent network. Each node of at least one of the node stages includes a control element for storing control information for controlling the transmission of data through the system.

One specific illustrative embodiment of the invention is used in the exemplary photonic system 10 (shown functionally in FIG. 1) which implements a 16×16 space division switching network usable either as a packet switch or as a time-multiplexed circuit switch. Sixteen optical input signals are received on fibers of a 2×8 fiber array 21. Each optical input signal may be switched by photonic system 10 for transmission on one fiber of a 2×8 fiber array 22 as an optical output signal. Photonic system 10 includes a plurality of input line circuits 30, a 4×8 fiber array 23, a lens 80, eight pairs of optical hardware modules 50, 50' through 57, 57', a lens 70, a 4×4 fiber array 24, and a plurality of output line circuits 40. (The optical setup is shown in more detail in FIGS. 9-11.) It is important to note that photonic system 10 processes arrays of beams in parallel and that the optical transmissions represented by single beams herein are beam arrays of rectangular cross-section. A network controller 60, which may be implemented using a single software-controlled processor or using a hardware logic circuit arrangement, establishes and disconnects paths through photonic system 10 by inserting control information via line circuits 30 into the network for storage therein.

The network topology implemented by photonic system 10 comprises expansion, a perfect shuffle equivalent network, and concentration. The topology is based on a three dimensional crossover network (FIGS. 18-20) having eight node stages N1 through N8 and seven link stages L1 through L7. The topology was chosen to be the same as that implemented by photonic system 10 of FIG. 1 in the referenced Cloonan application 07/349,008, thus allowing a ready comparison between the two systems. Each of the optical hardware modules (e.g., module 51(FIG. 2)) is based on the optical hardware apparatus described in detail with respect to FIG. 93 in the referenced Cloonan application 07/349,008. The laser source PRESET is used for the same purpose as in the referenced Cloonan application 07/349,008, however the POWER$_{ODD}$, and POWER$_{EVEN}$ laser sources are used to illuminate odd and even rows of the 8×8 symmetric self electro-optic effect device (S-SEED) arrays 500 (FIG. 3). Note that the S-SEEDs are oriented horizontally rather than vertically as in the referenced Cloonan application 07/349,008. Since the optical nodes (referred to as (2,1,1) nodes because they have two data inputs, one data output, and capacity one) in photonic system 10 of the present application are implemented using four S-SEEDs, two from one S-SEED array and two from the following S-SEED array, twice as many S-SEED arrays and optical hardware modules are required to implement the node stages and link stages of the topology. The term "data connection state", as referred to herein with respect to the (2,1,1) optical nodes, indicates which, if any, of the two data inputs is optically connected to the data output of the node. The optical setup of the optical hardware modules 50, 50' through 57, 57' is shown in FIGS. 9-11. Three consecutive optical hardware modules are shown in detail in FIGS. 14-16. Each optical hardware module is identical except for the orientation and granularity of the mirrors and prismatic mirror arrays associated with the optical crossover interconnects, e.g., 100, 100' (FIG. 9). Interconnect 100 is used to provide link stage L1 of the topology while interconnect 100' is used to provide the optical interconnections between the first pair of S-SEEDs and the second pair of S-SEEDs within the optical (2,1,1) node. The variations between the optical crossover interconnects 100 of the optical hardware modules 50 through 57 are defined by rules illustrated by FIGS. 4 and 5 and the topology of FIGS. 18-20. The optical crossover interconnects 100' of the optical hardware modules 50' through 57' are identical and include prismatic mirror arrays as illustrated in FIG. 6.

Photonic system 10 (FIG. 1) of the present application differs from photonic system 10 of the reference Cloonan application 07/349,008, in the way that the switching is controlled. In the referenced Cloonan application 07/349,008, network controller 60 establishes and disconnects paths via stage controllers 30 through 35 using spatial light modulators, e.g., 409, which control the generation of disable beams corresponding to individual S-SEEDs to be disabled. In the present application, network controller 60 establishes and disconnects paths by inserting control information via input line circuits 30. The control information is shifted into the network via the straight connections of the topology for storage by otherwise unused S-SEEDs of the node stages preceding the nodes being enabled for data communication. The network is referred to herein as an embedded control network since control information is stored within the network nodes. Path hunt algorithms and network controller functions are described in the referenced Cloonan application 07/349,008, from page 25, line 26 through page 40, line 18. Network controller 60 of the present application implements the algorithms and functions for the embedded control network herein, and reformats the path establishment information from the algorithm on a row-wise basis (including a conversion from the identities of the nodes to be activated for a particular path through the network to the identities of the corresponding preceding stage control nodes). The row-wise format is used to simultaneously shift control information into the rows of nodes of the network.

Network controller 60 stores the busy/idle status of all nodes and links of photonic system 10 for use in performing the path hunt function. Once a path has been activated through system 10, network controller 60 assigns that path to a given connection from an inlet to an outlet and communication is enabled via that path for only the given connection. Network controller 60 assures that no part of the assigned path is used to provide any other connections from inlets to outlets.

Input line circuit 30 (FIG. 7) receives optical data representing, for example, voice, digital computer data, image, or video information, on one of the fibers of fiber array 21, converts that optical data to corresponding electrical signals via O/E converter 31, and selectively transmits the electrical signals for storage in one of two buffers 32. Two buffers 32 are used to allow information to be stored in one buffer 32 while other information is being read from the second buffer 32 as is well known. The read/write control of buffers 32 may be effected by network controller 60 or, alternatively, by a clock circuit (not shown). If system 10 is used to perform packet switching, the contents of the buffers 32 are periodically examined by network controller 60 such that a packet header stored in one of the buffers 32 is read and processed by network controller 60 to determine an unused path between the optical network inlet associated with that buffer 32 and the optical network outlet determined by network controller 60 based on the contents of the packet header. Network controller 60 then computes the identities, for example as row, column and stage addresses, of all of the network nodes in the topology of FIGS. 18-20 which require the storage of a predetermined control bit to activate a succeeding stage node that is part of the determined unused path. The computed addresses are transmitted via a plurality of buses B1 through B7 through all the input line circuits 30. Address decoders 34 respond to the transmitted addresses by storing the appropriate rows of control bits in flip/flops 35. During a control loading mode of operation, the control bits of each of the rows included in the input line circuits 30 are shifted via an associated multiplexer 36, E/O converter 37, and the corresponding optical network inlet fibers of fiber array 23 for storage in the appropriate nodes of the optical network. During a data passing mode of operation, data stored in one of the buffers 32 is transmitted via multiplexers 33 and 36, and E/O converter 37 to the associated optical network inlet fiber of fiber array 23 for communication of a packet or time slot through the optical network via the non-shared connection provided by those optical nodes comprising the now activated path.

Output line circuit 40 (FIG. 12) receives optical data and control information from one of the fibers of fiber array 24, converts that information to corresponding electrical signals via O/E converter 41, and transmits the electrical signals to one input terminal of an exclusive-OR gate 43. A flip-flop 42 is set if the first bit of the received data is a predetermined value indicating that the data stream to follow was inverted due to its transmission through the optical network. If flip-flop 42 is set, exclusive-OR gate 43 inverts the electrical signals it receives from O/E converter 41. The electrical signals transmitted by exclusive-OR gate 43 are selectively transmitted for storage in one of two buffers 44. Two buffers 44 are used to allow information to be stored in one buffer 44 while other information is being read from the second buffer 44. The read/write control of buffers 44 may be effected by a clock circuit (not shown) and is used to delete control information from the information stored in the buffers 44. The contents of the two buffers 44, now representing data rather than control information, are alternately transmitted via multiplexer 45, converted to optical data via E/O converter 46, and transmitted as optical output signals on one of the fibers of fiber array 22.

DRAWING DESCRIPTION

Figure 1:
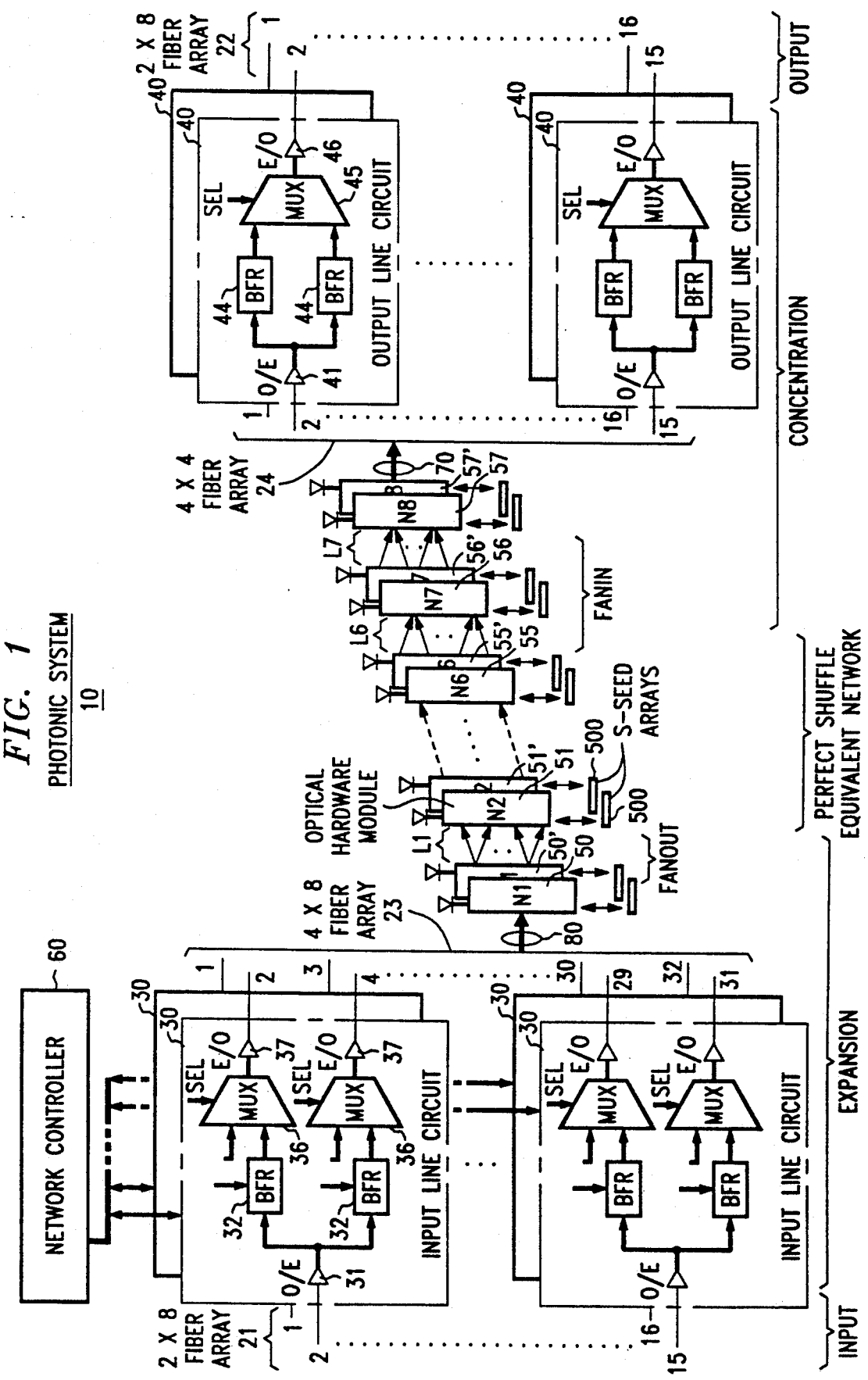
FIG. 1 is a functional diagram of an exemplary photonic system having embedded control elements.
Figure 2:
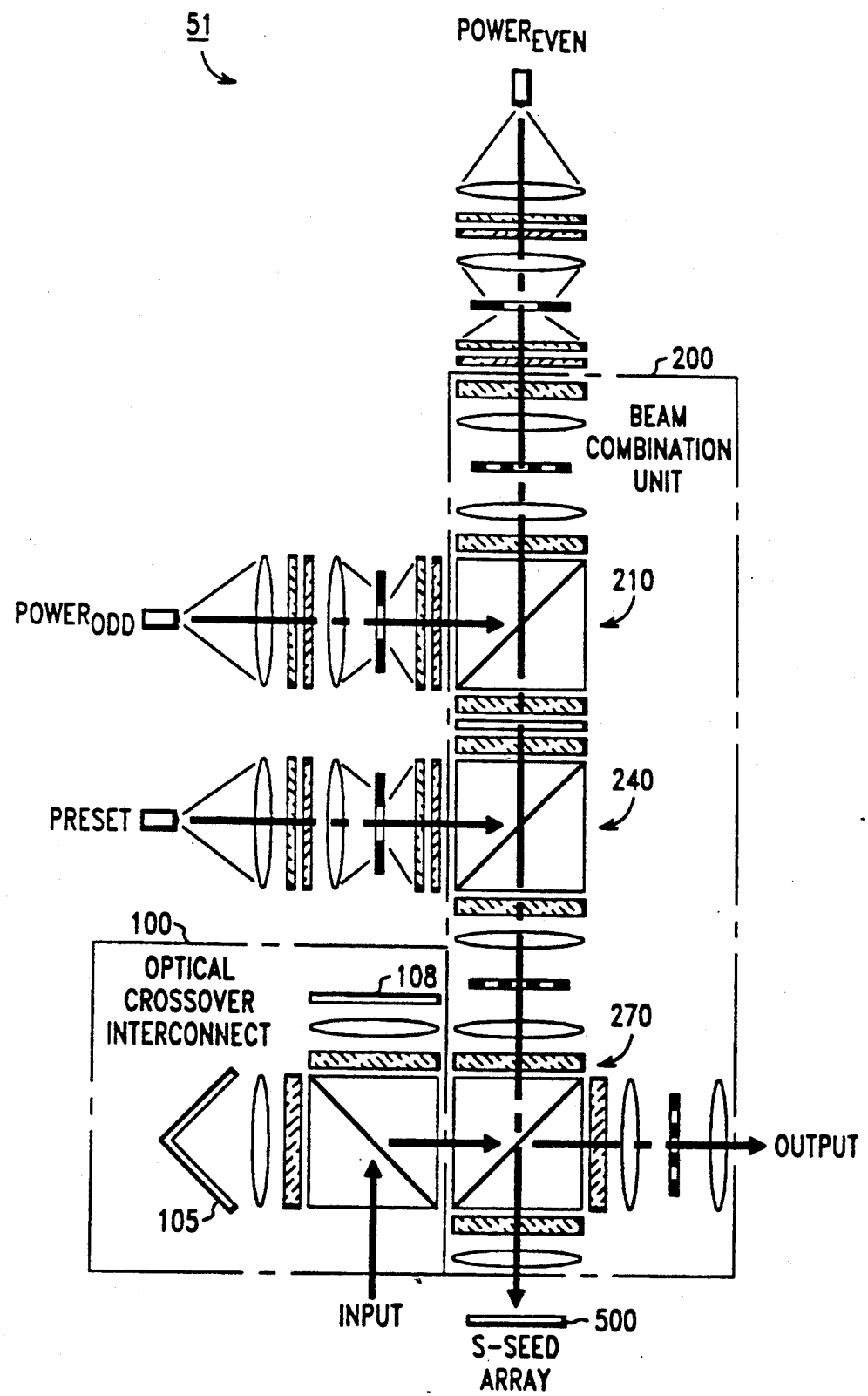
FIG. 2 is a diagram of an optical hardware module included in the photonic system of FIG. 1.
Figure 8:
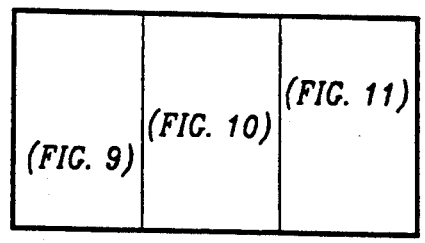
Figure 9:
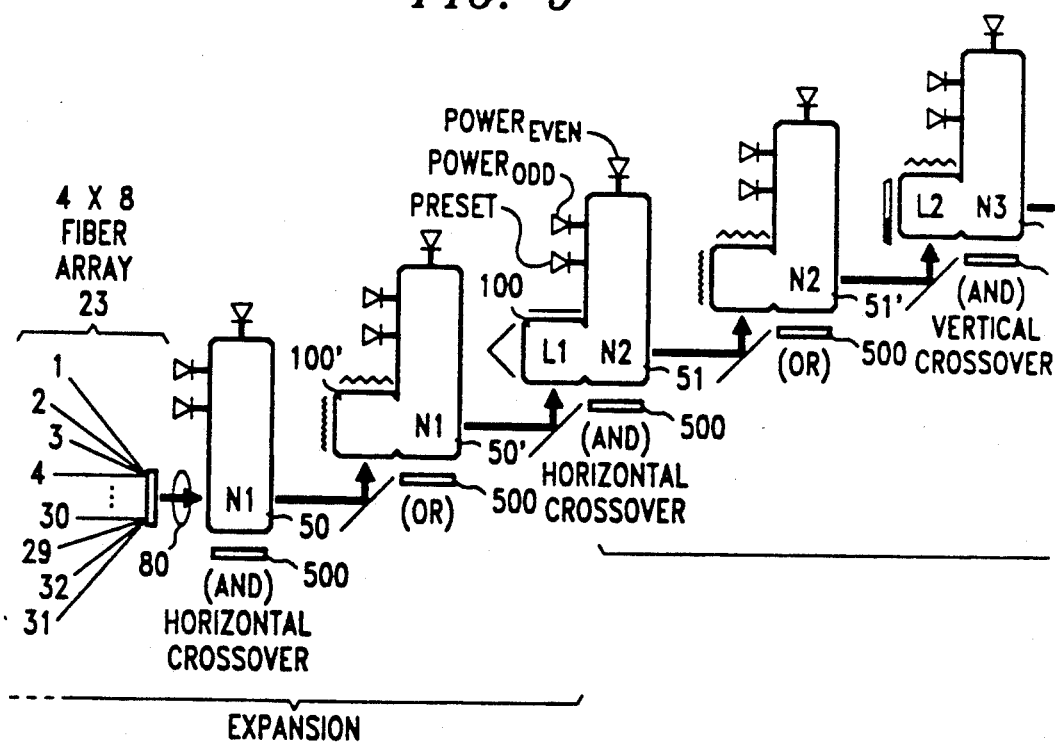
Figure 10:
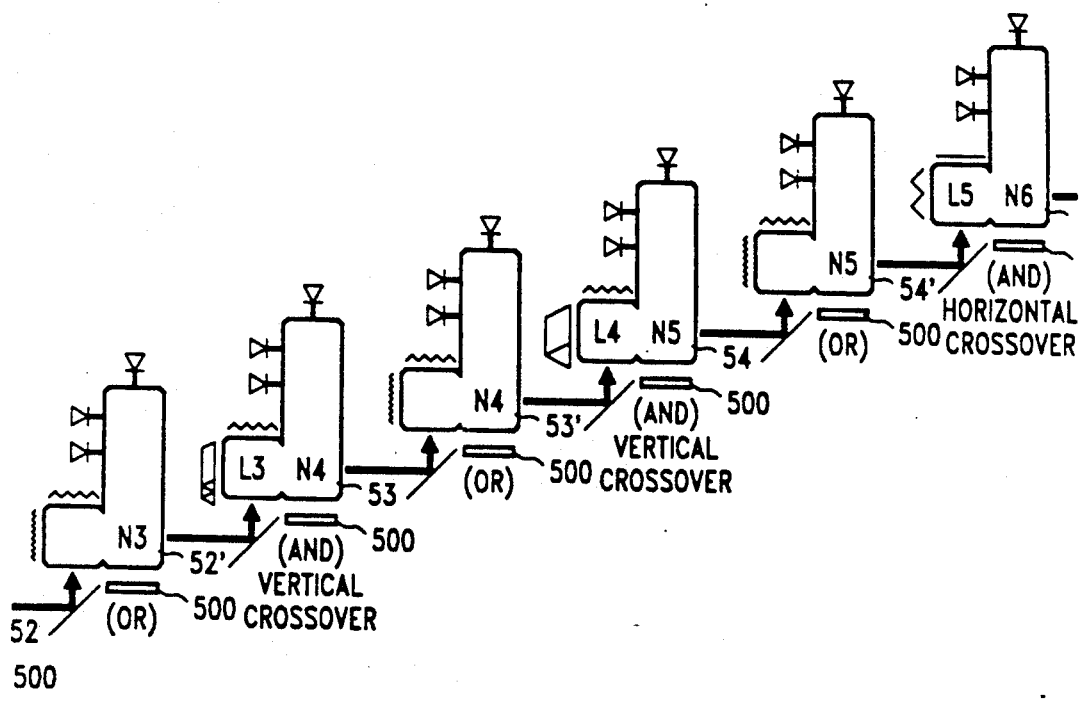
Figure 11:
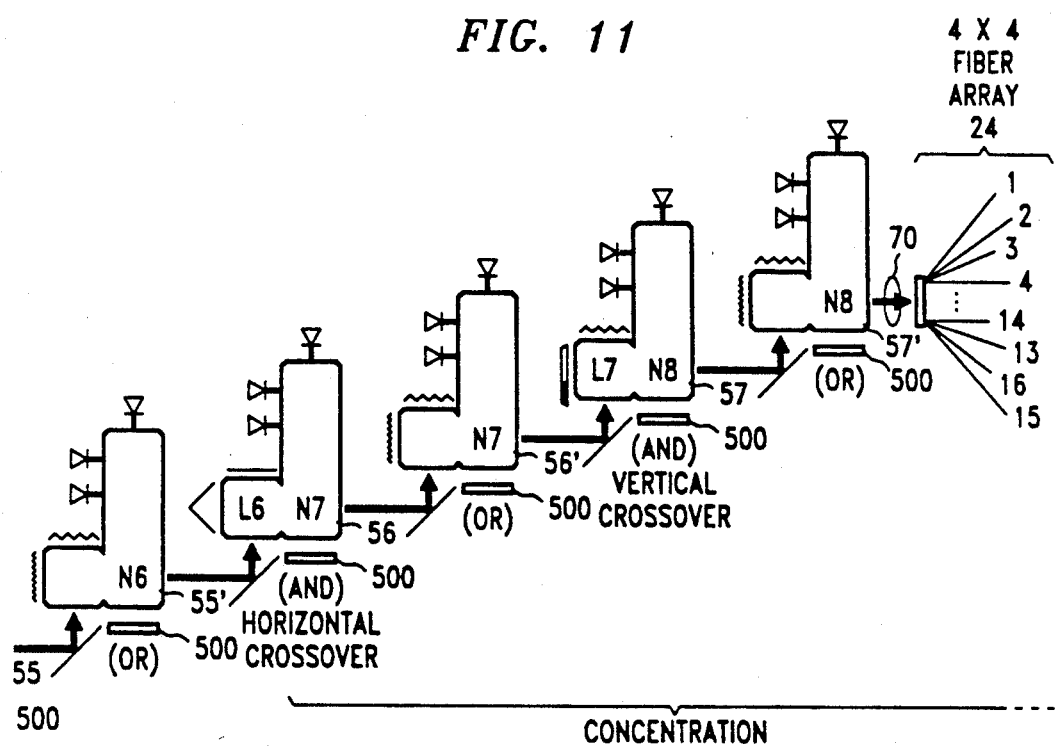
Figure 12:
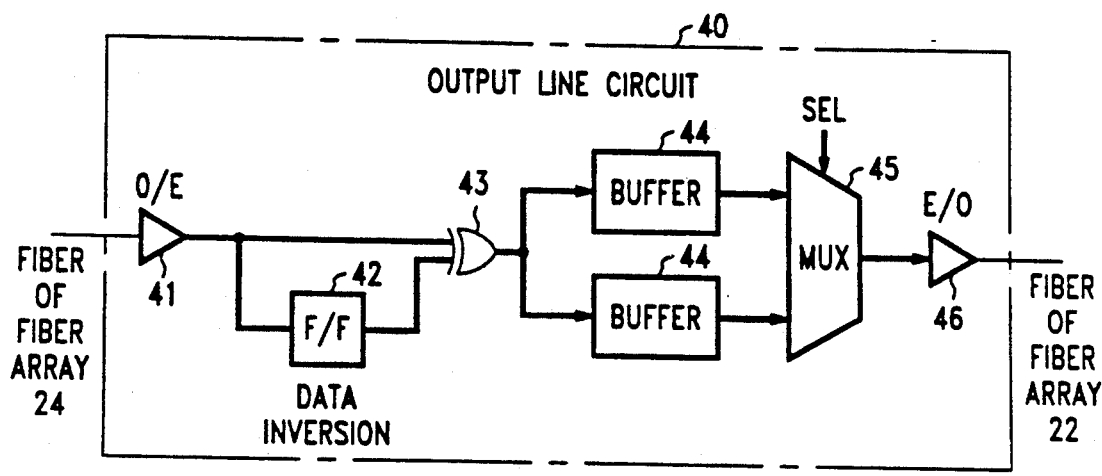
Figure 13:
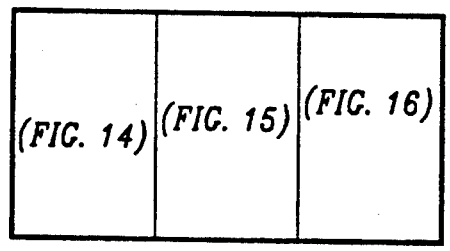
Figure 17:
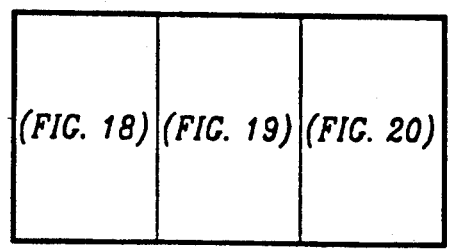
Figure 15:
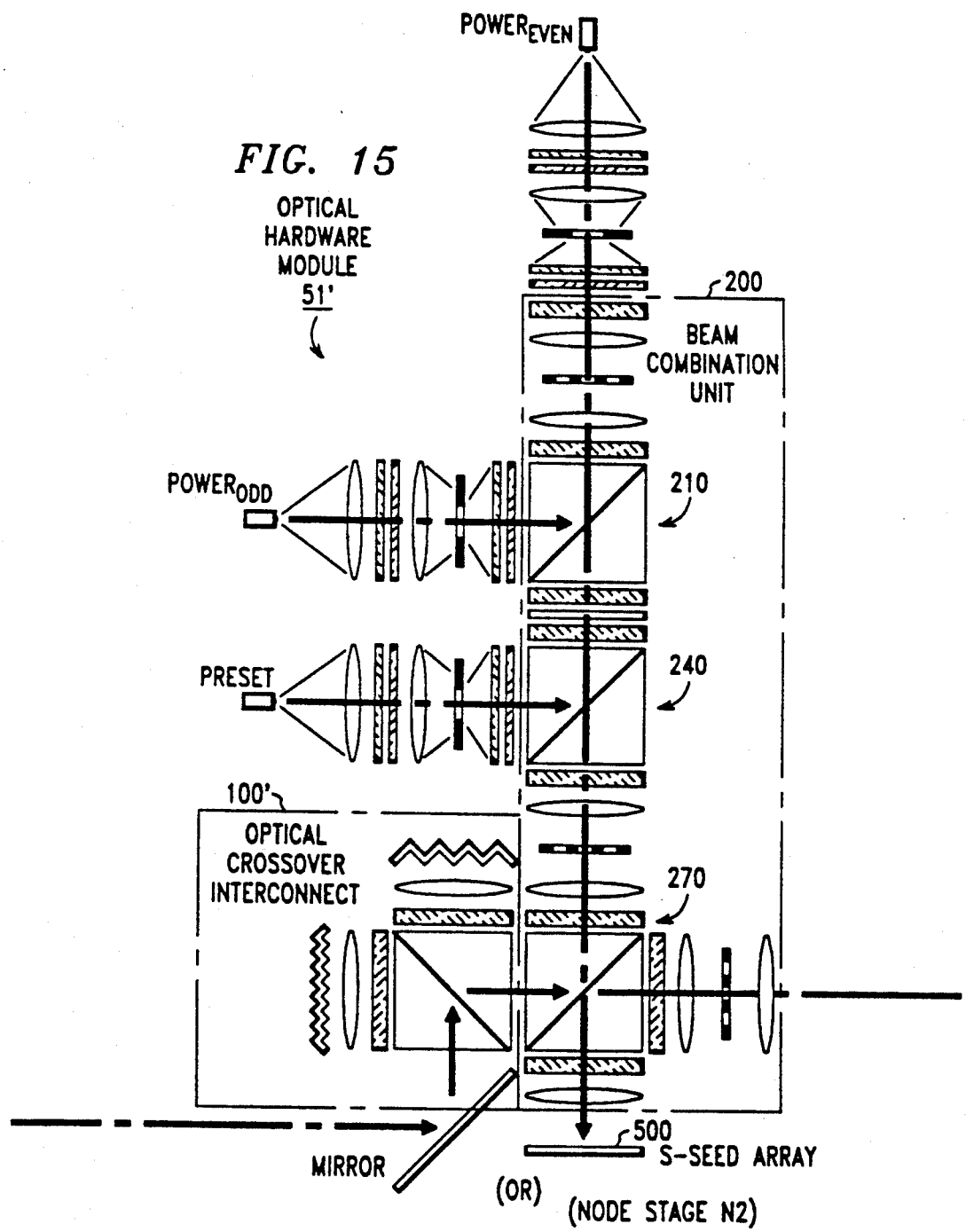
Figure 16:
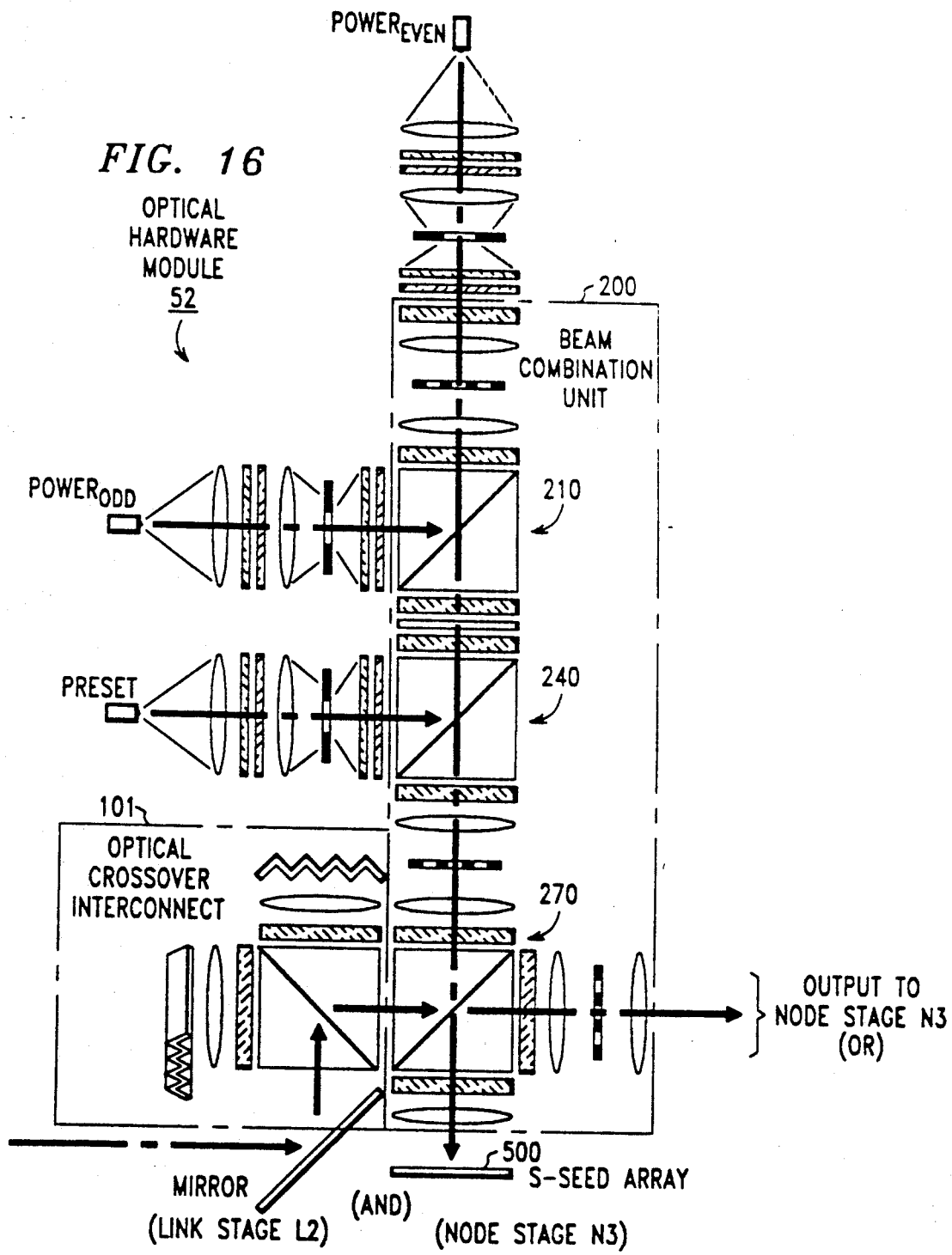
Figure 18:
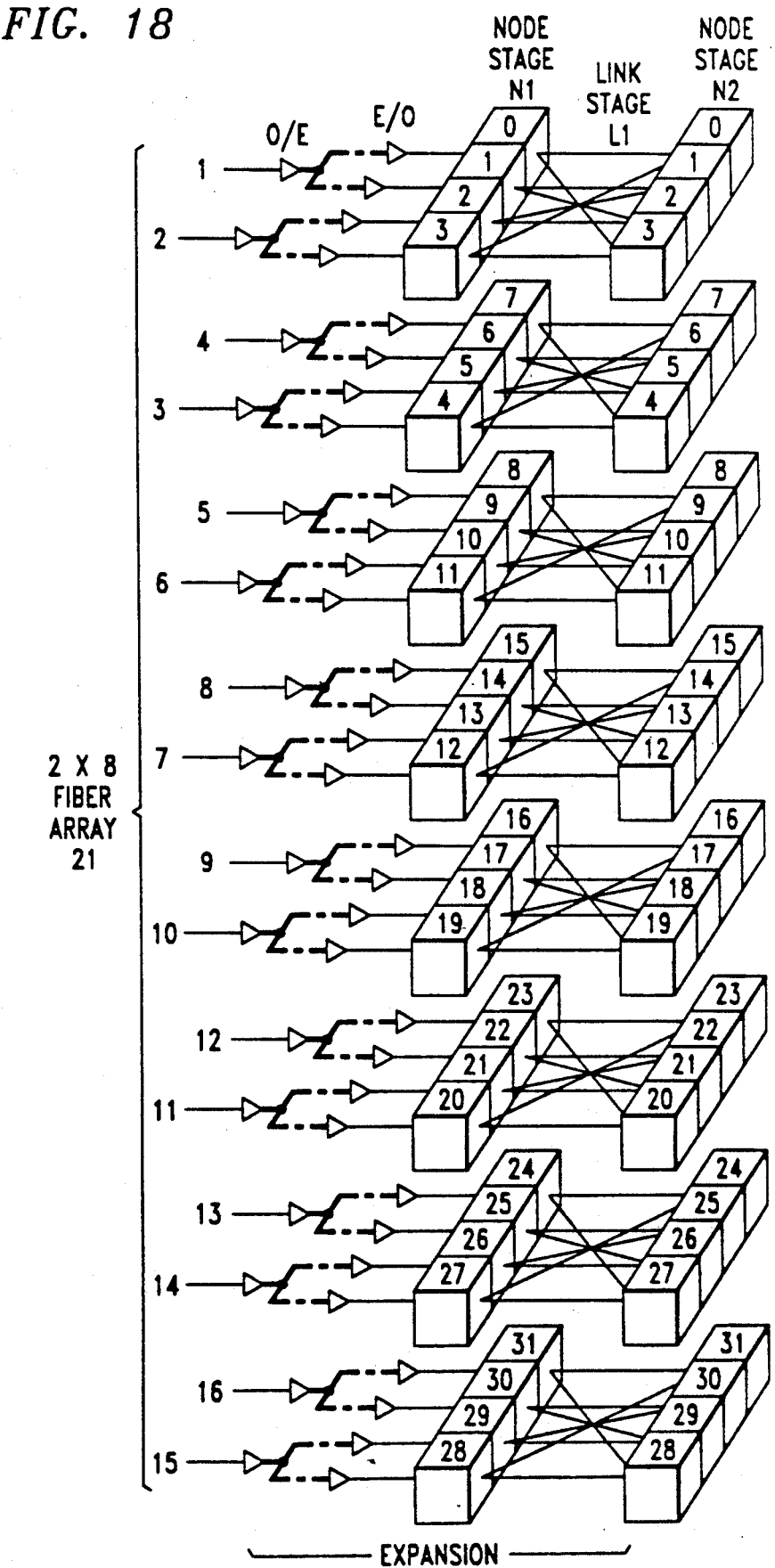
Figure 19:
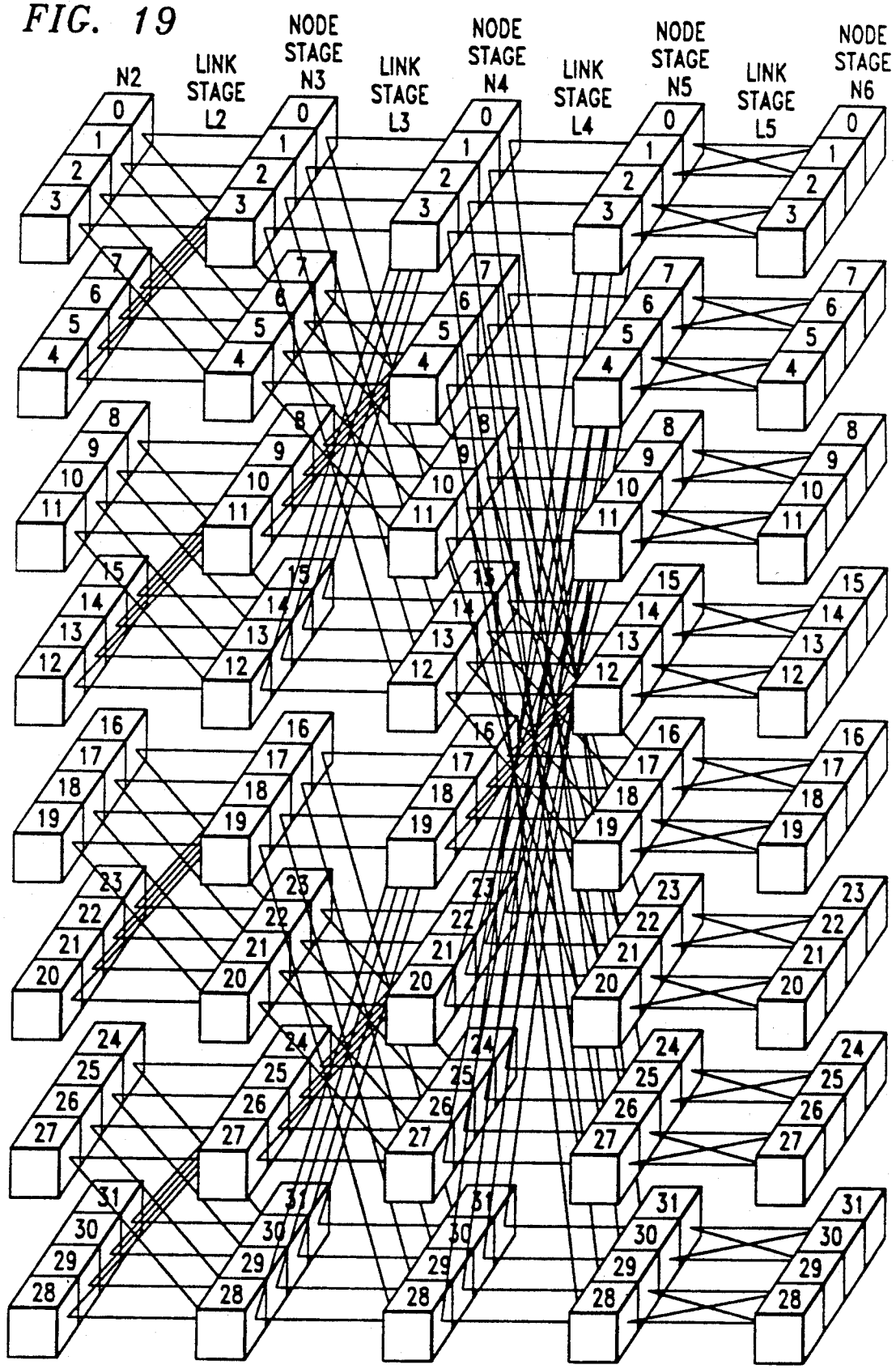
Figure 20:
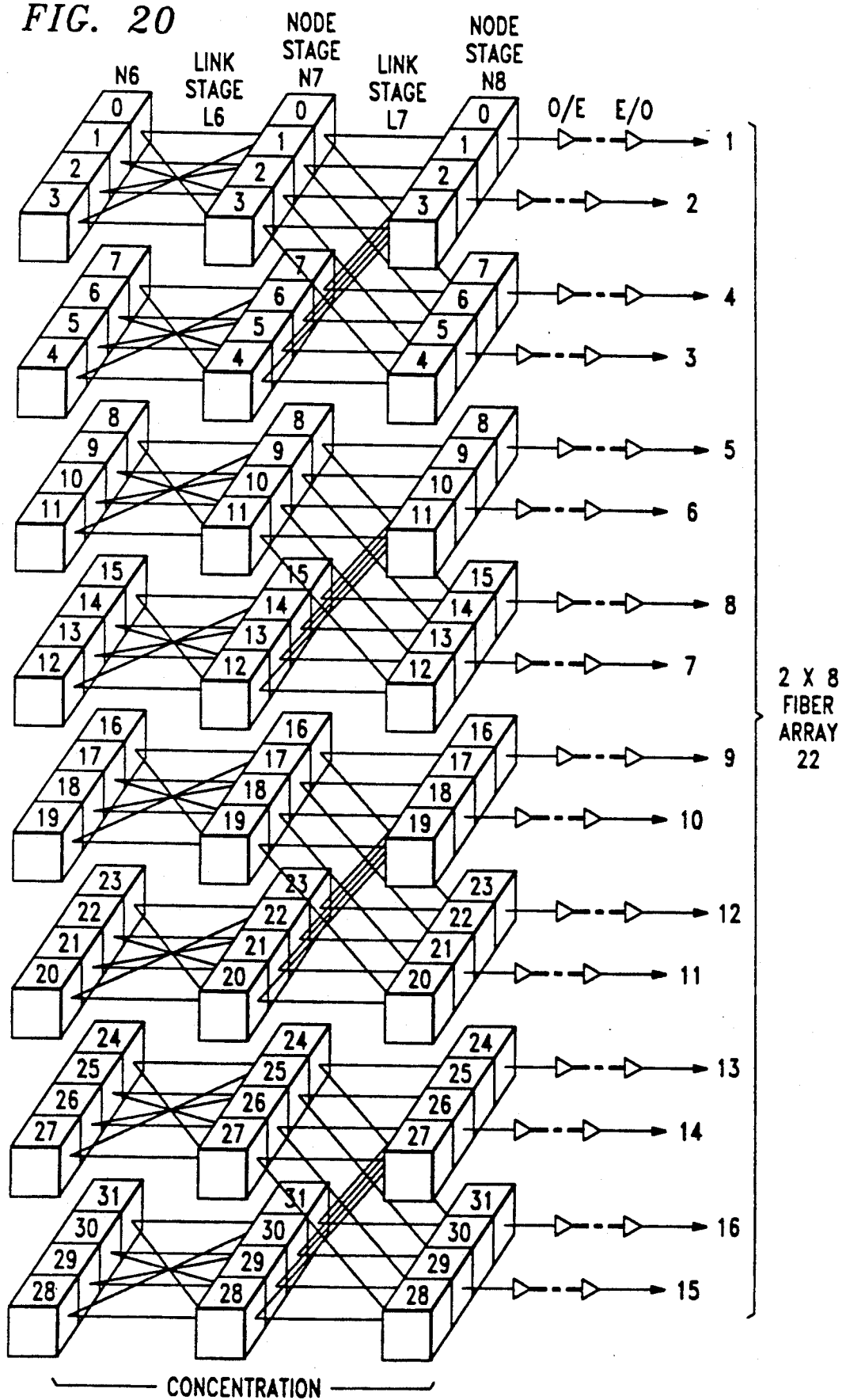
Figure 21:
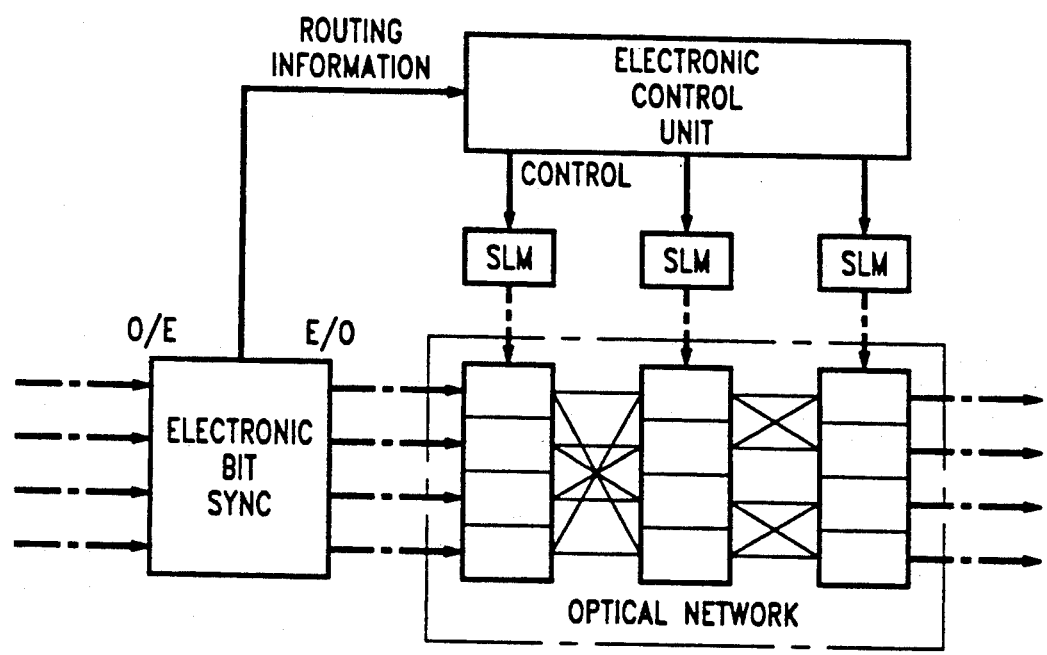
Figure 22:
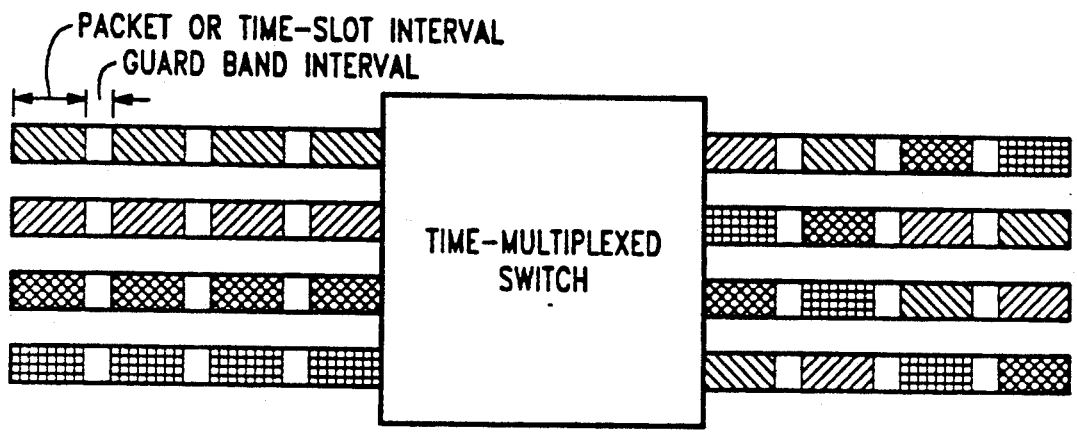
Figure 23:
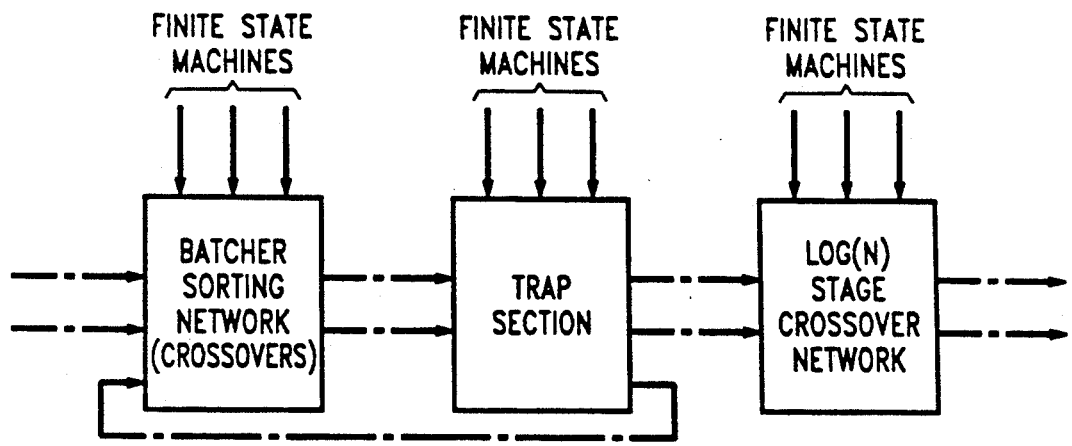
Figure 24:
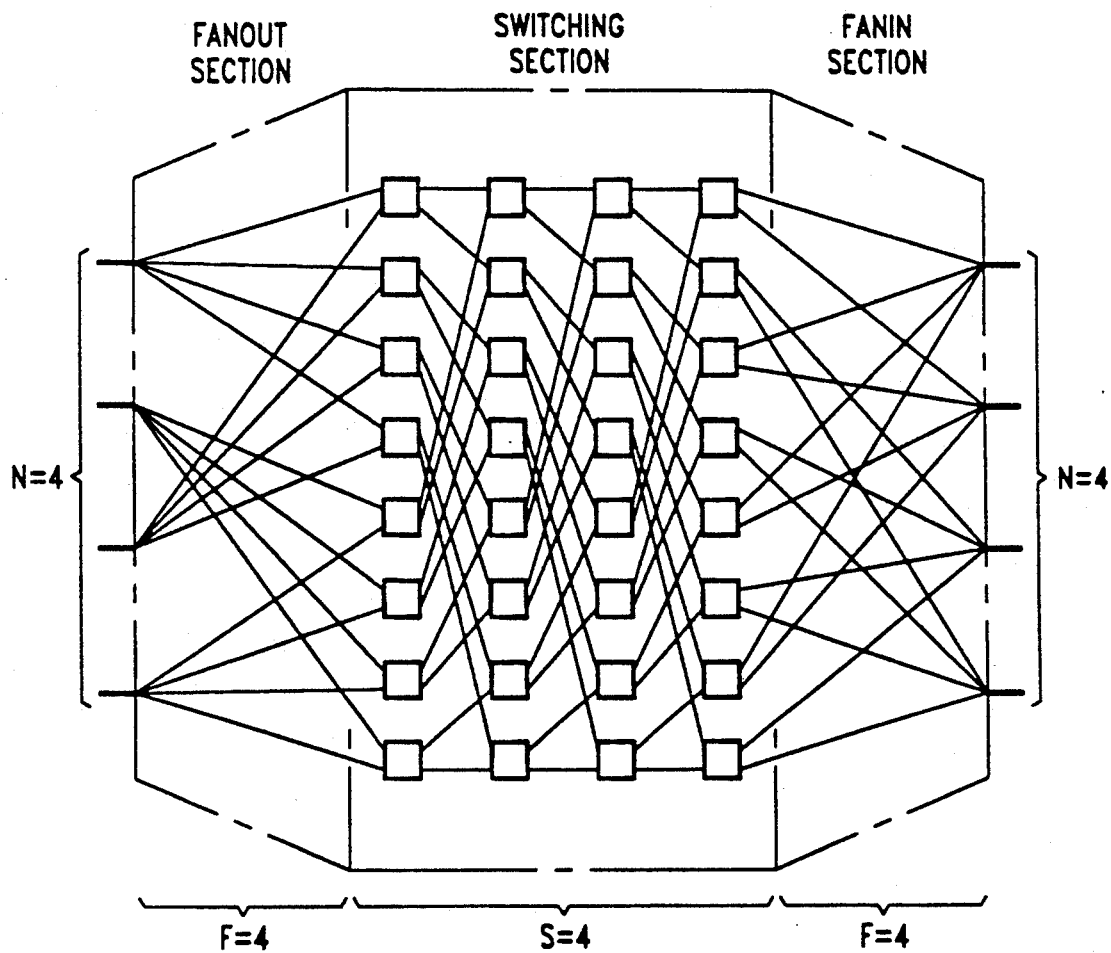
Figure 25:
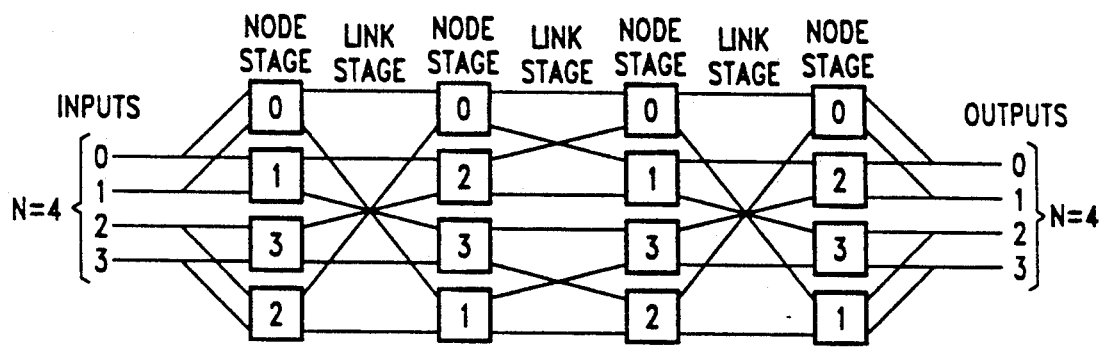
Figure 26:
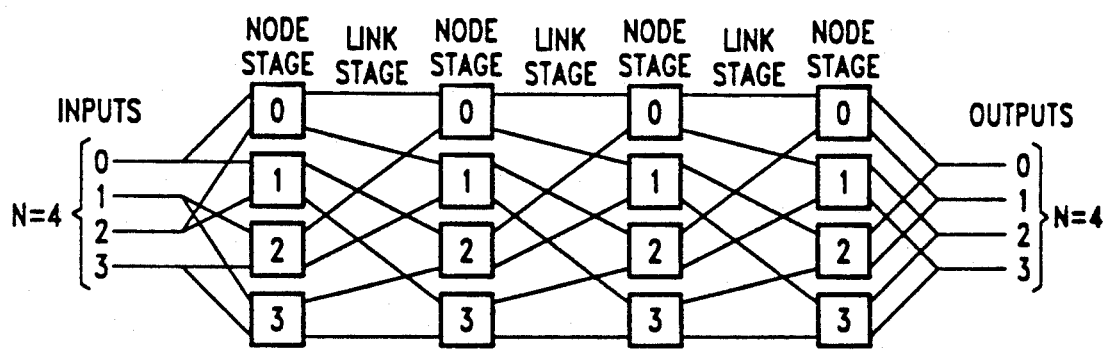
Figure 27:
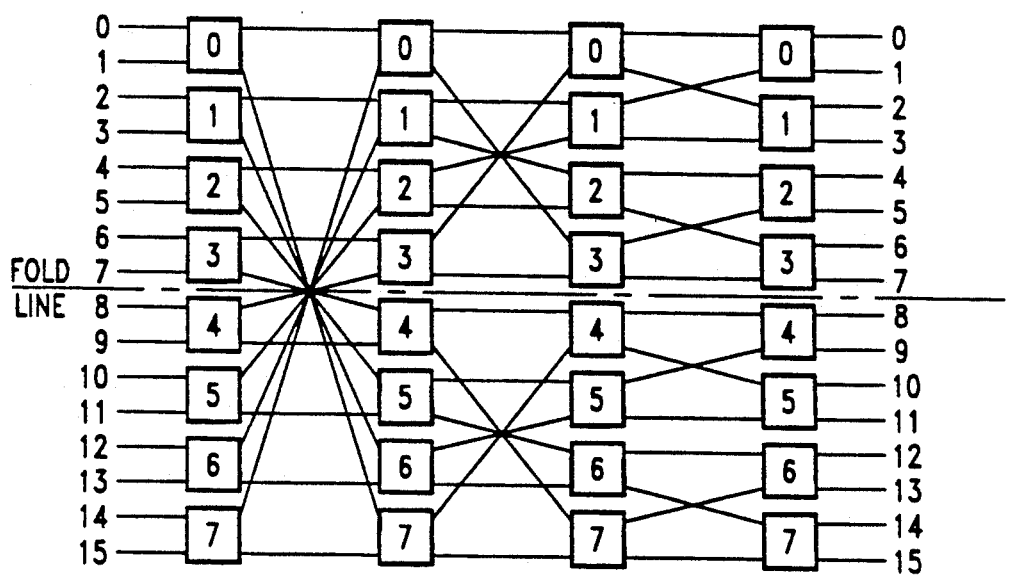
Figure 28:
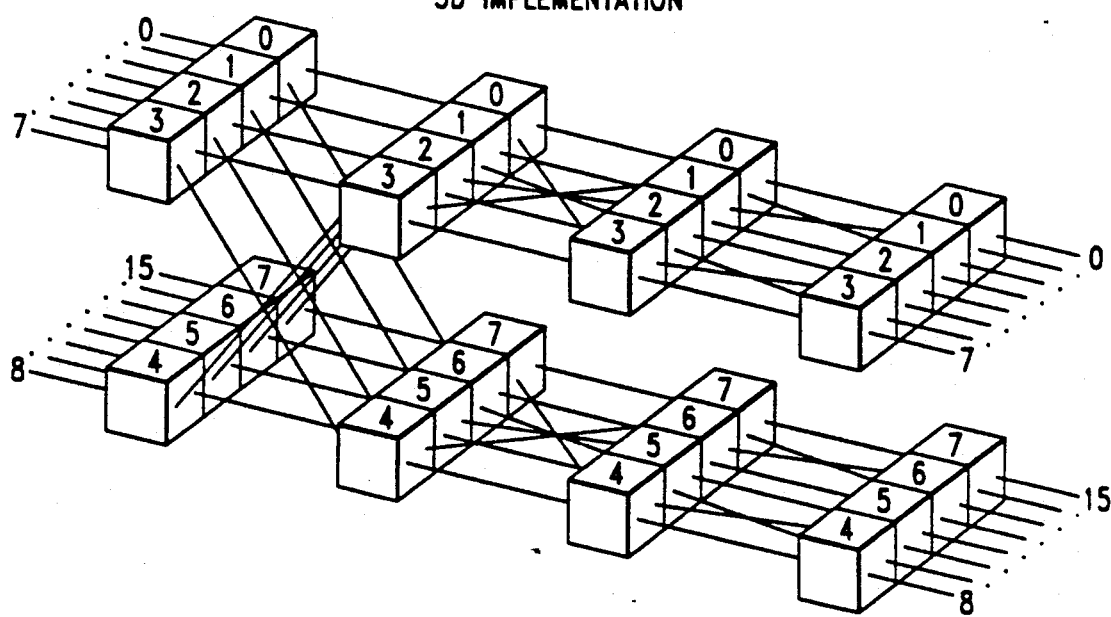
Figure 29:
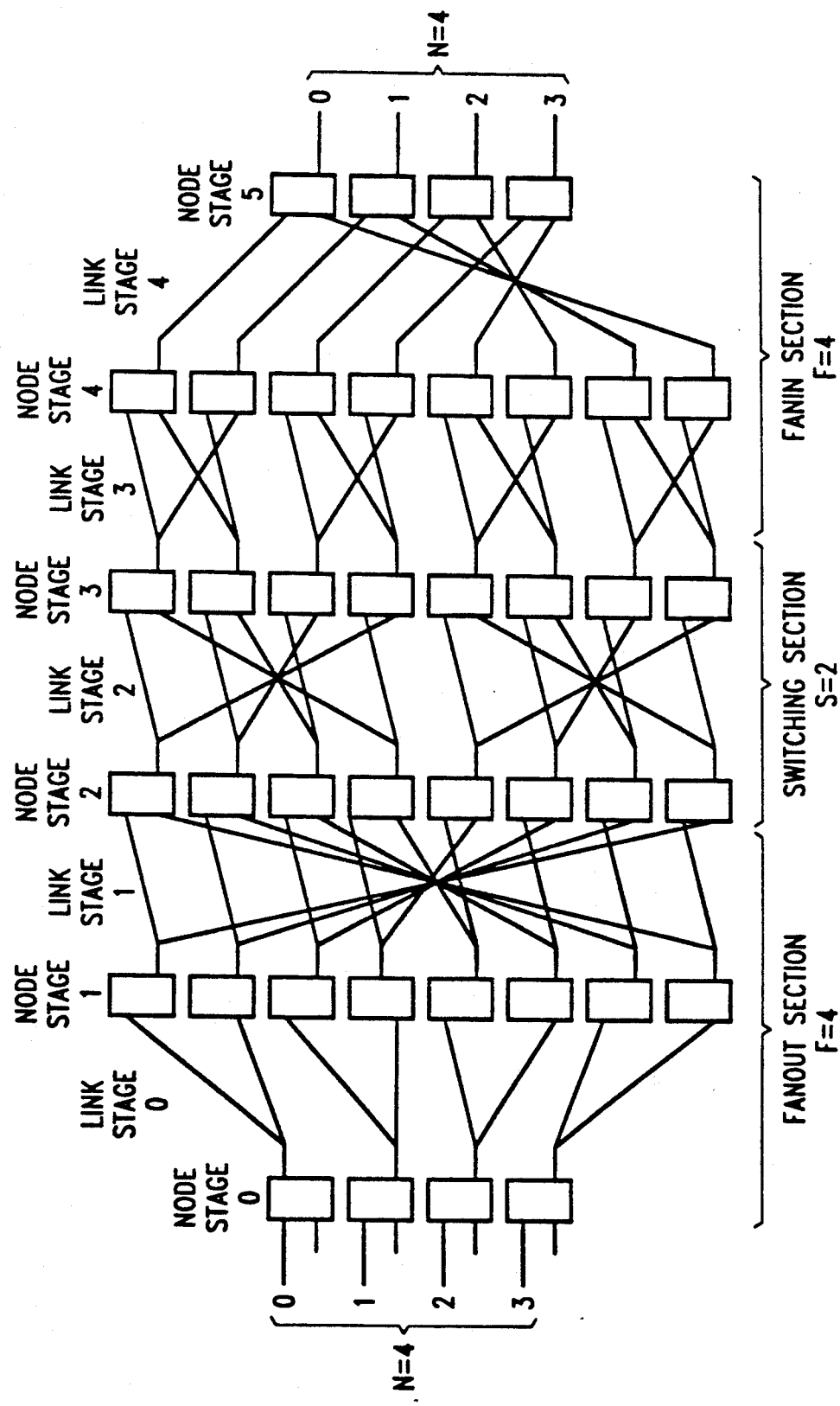
Figure 30:
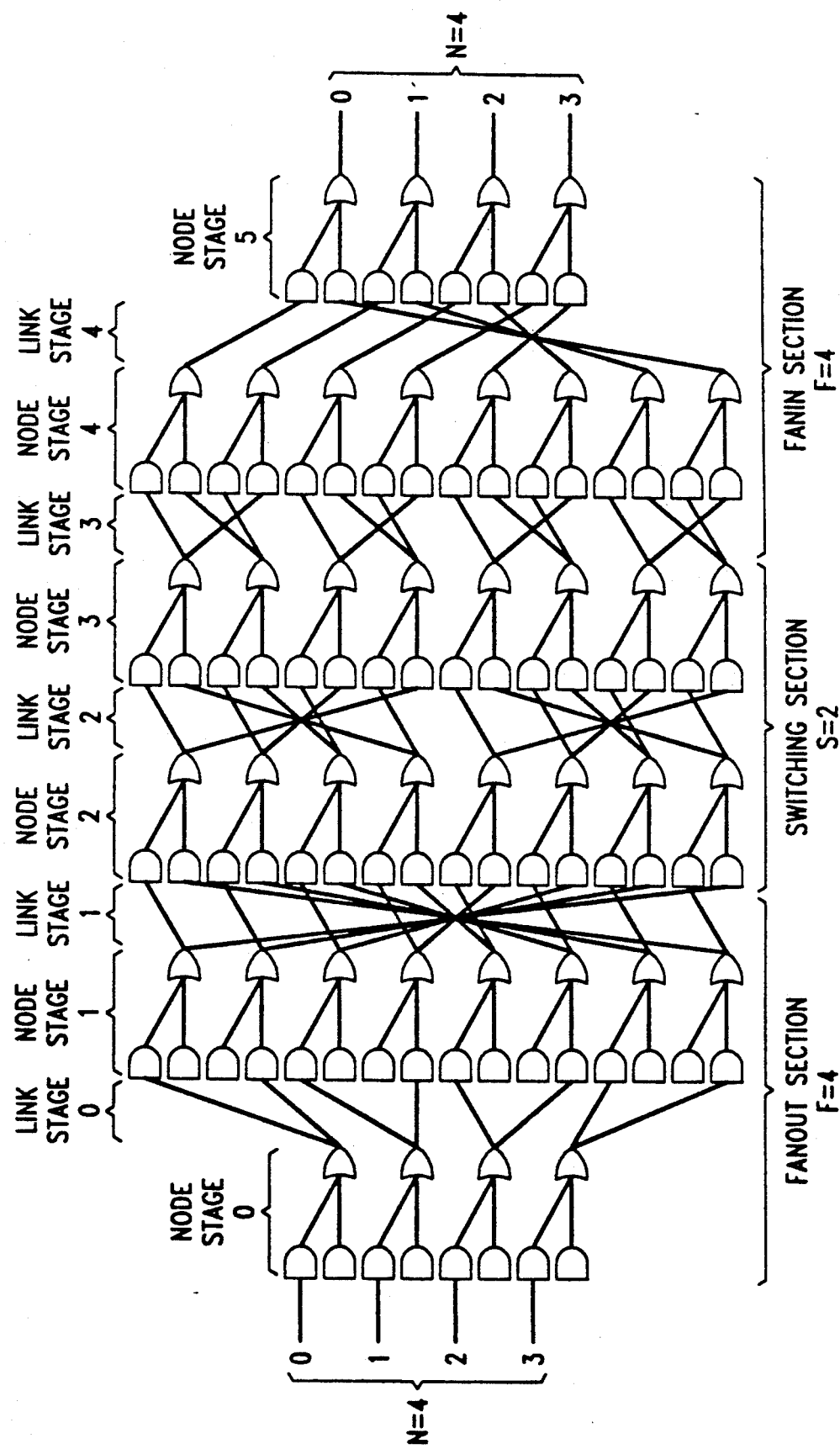
Figure 31:
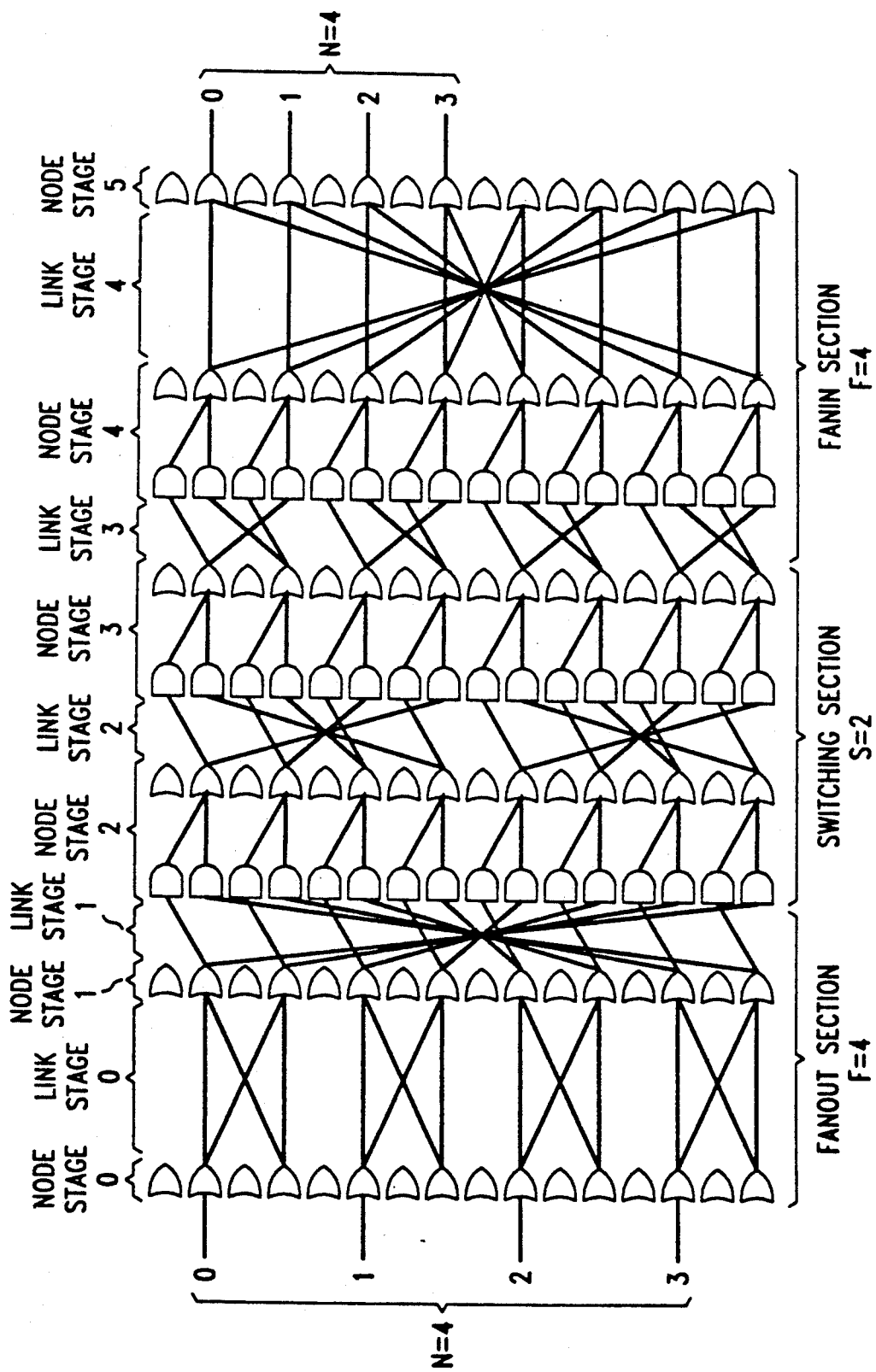
Figure 34:
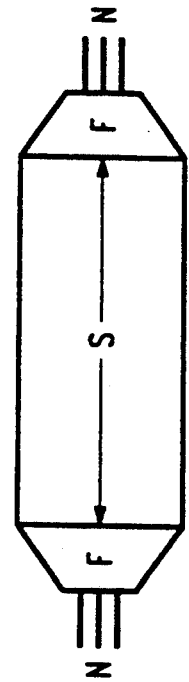
Figure 33:
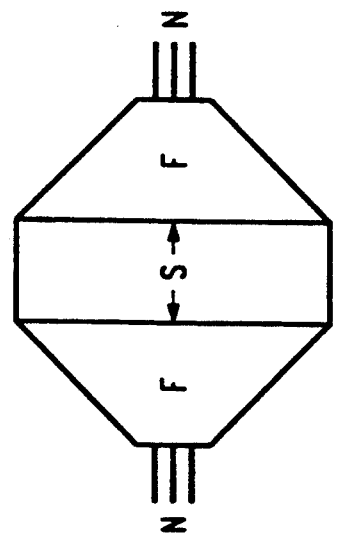
Figure 35:
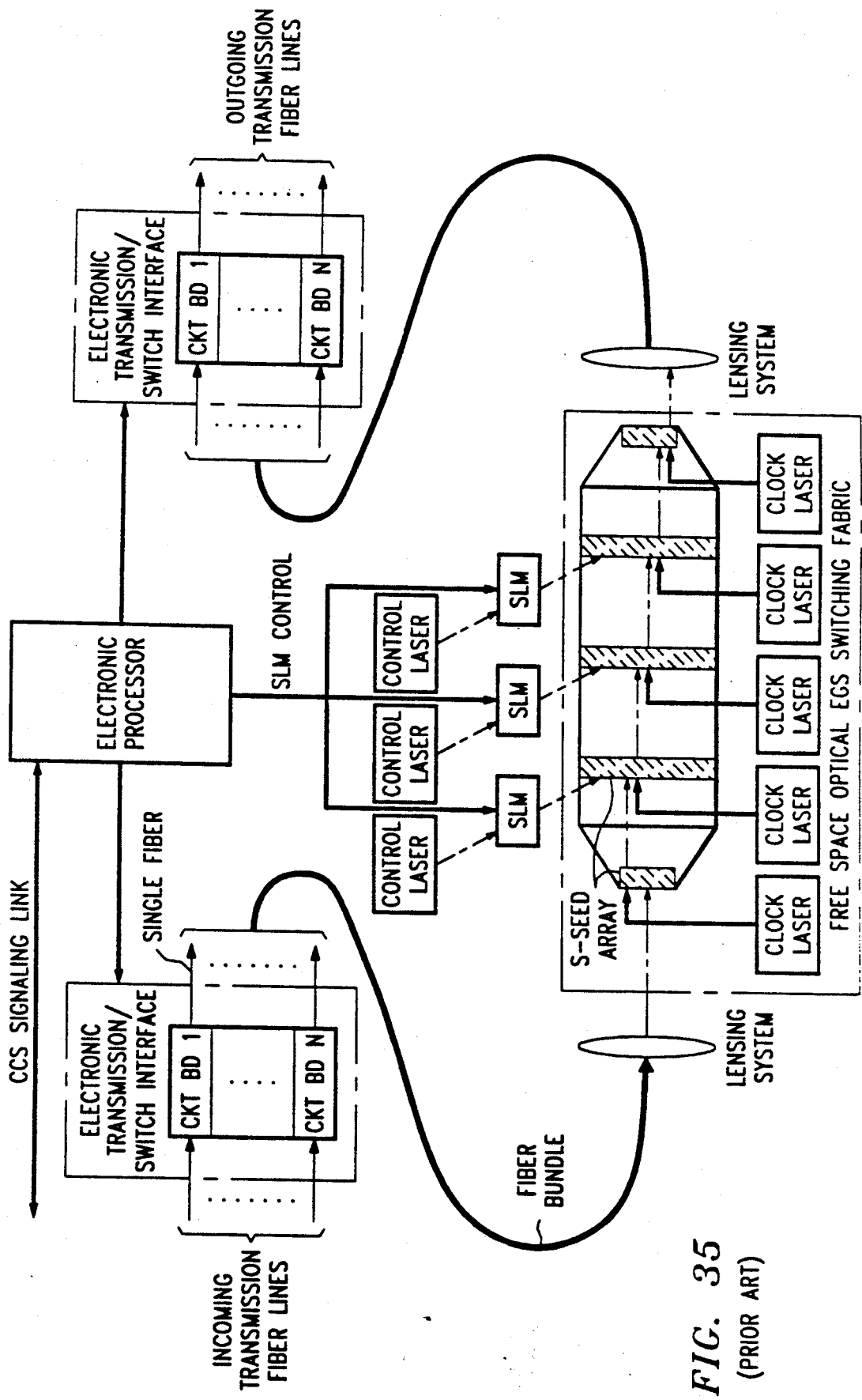
Figure 36:
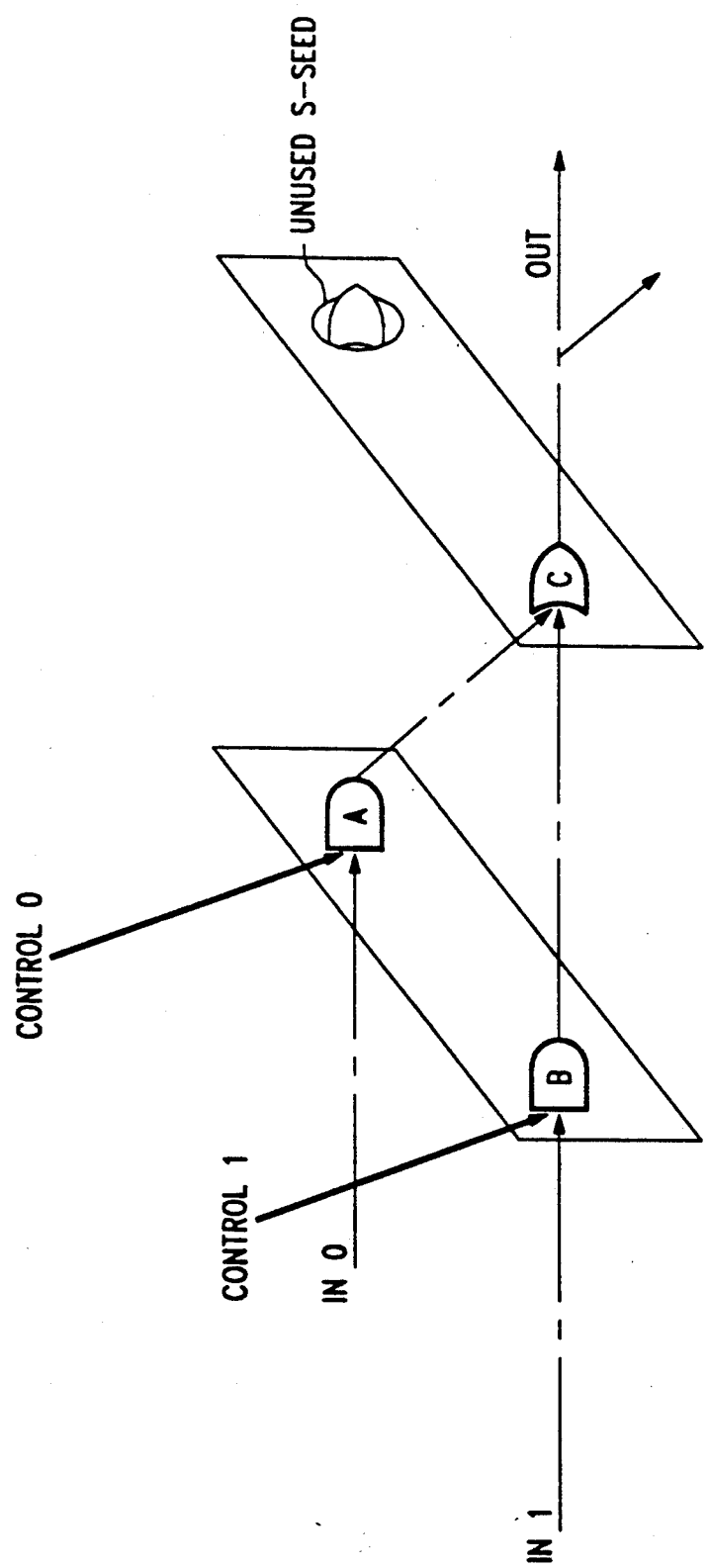
Figure 37:
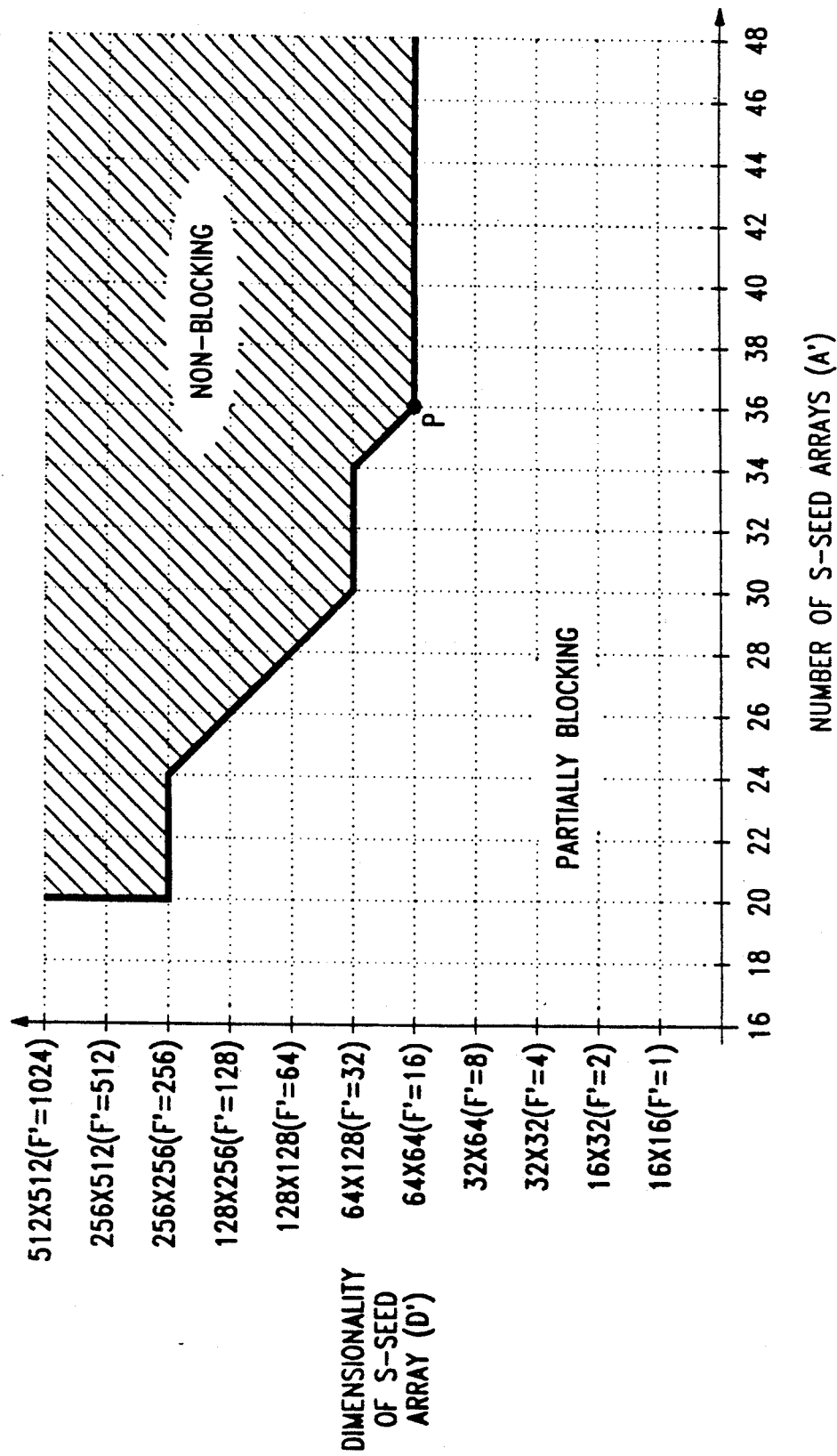
Figure 38:
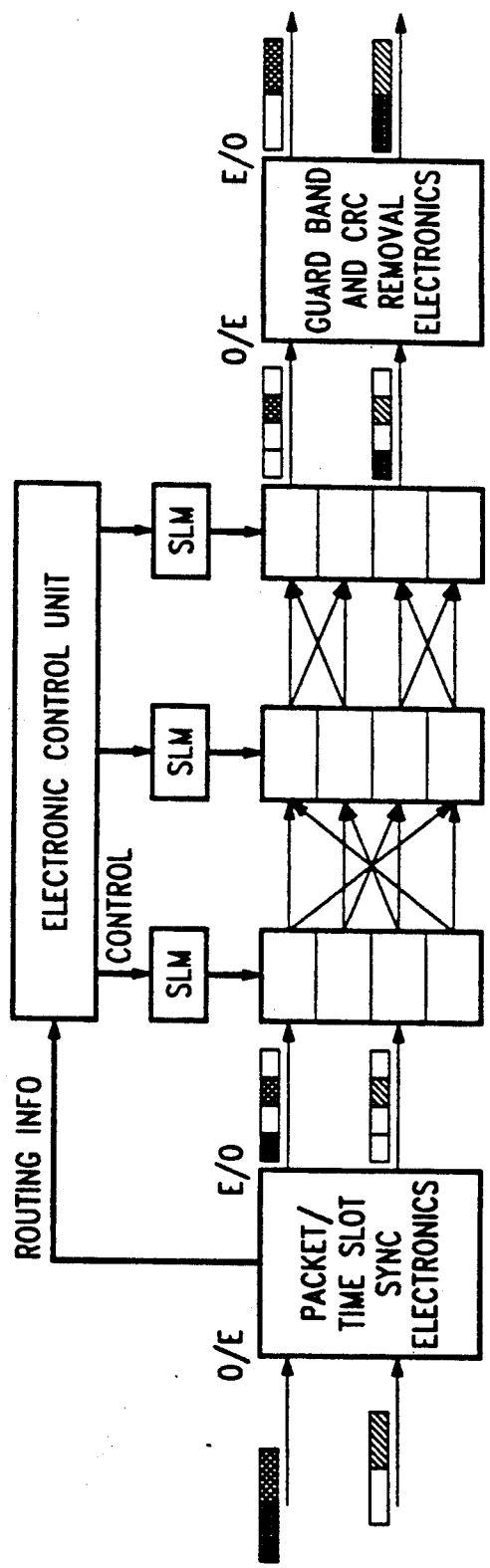
Figure 39:
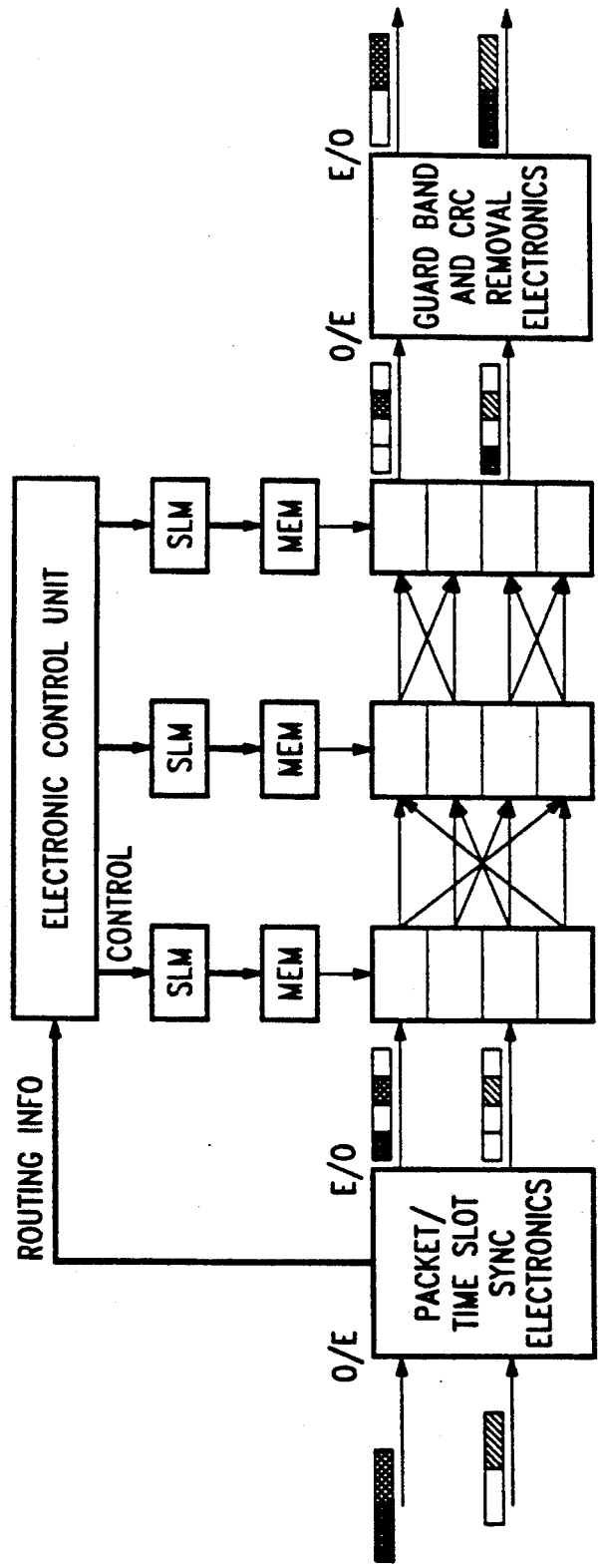
Figure 40:
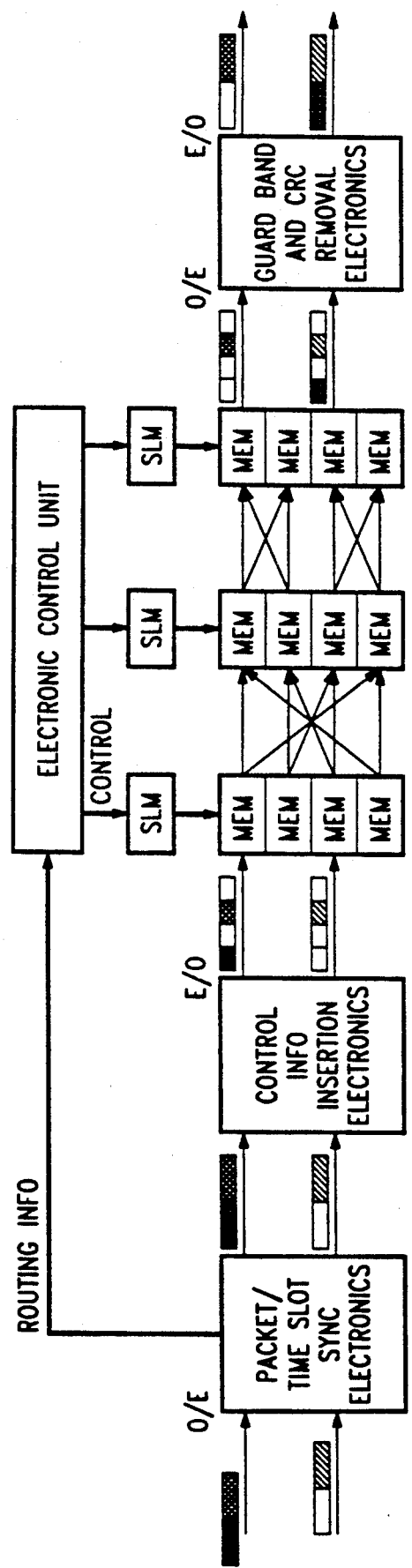
Figure 41:
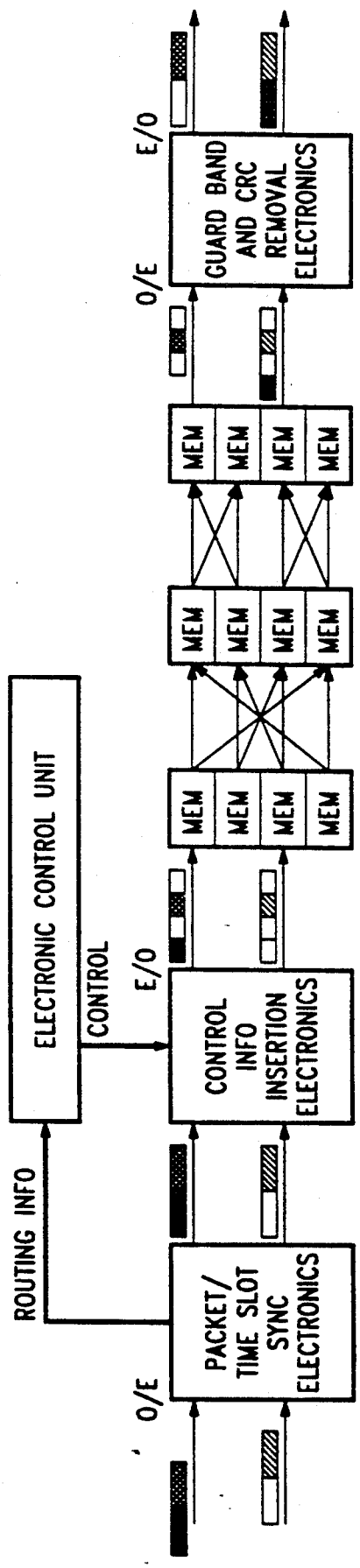
Figure 43:
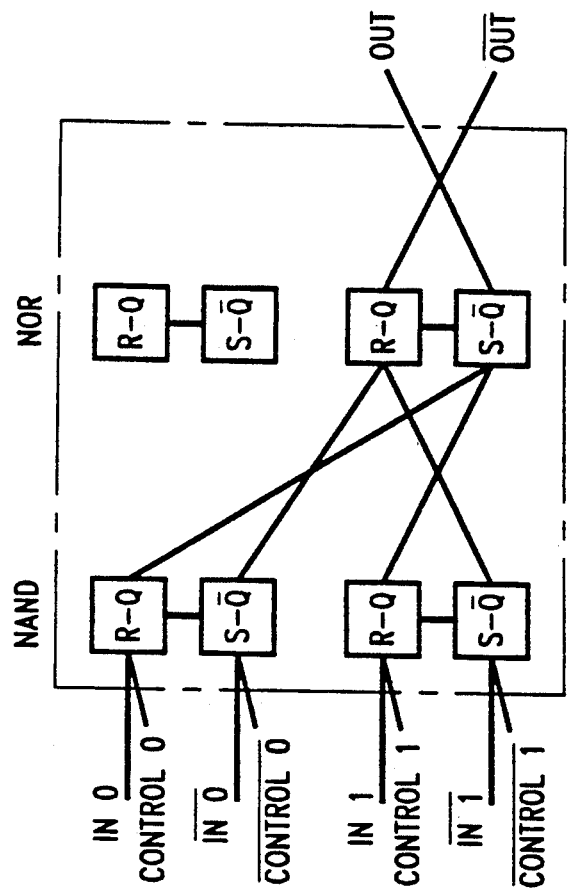
Figure 42:
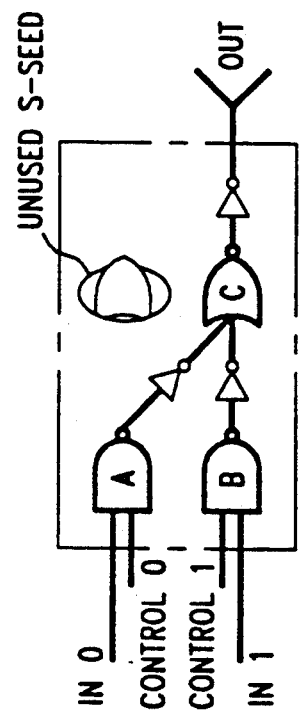
Figure 45:
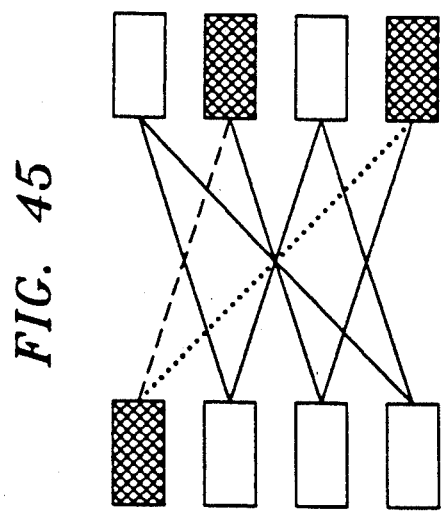
Figure 44:
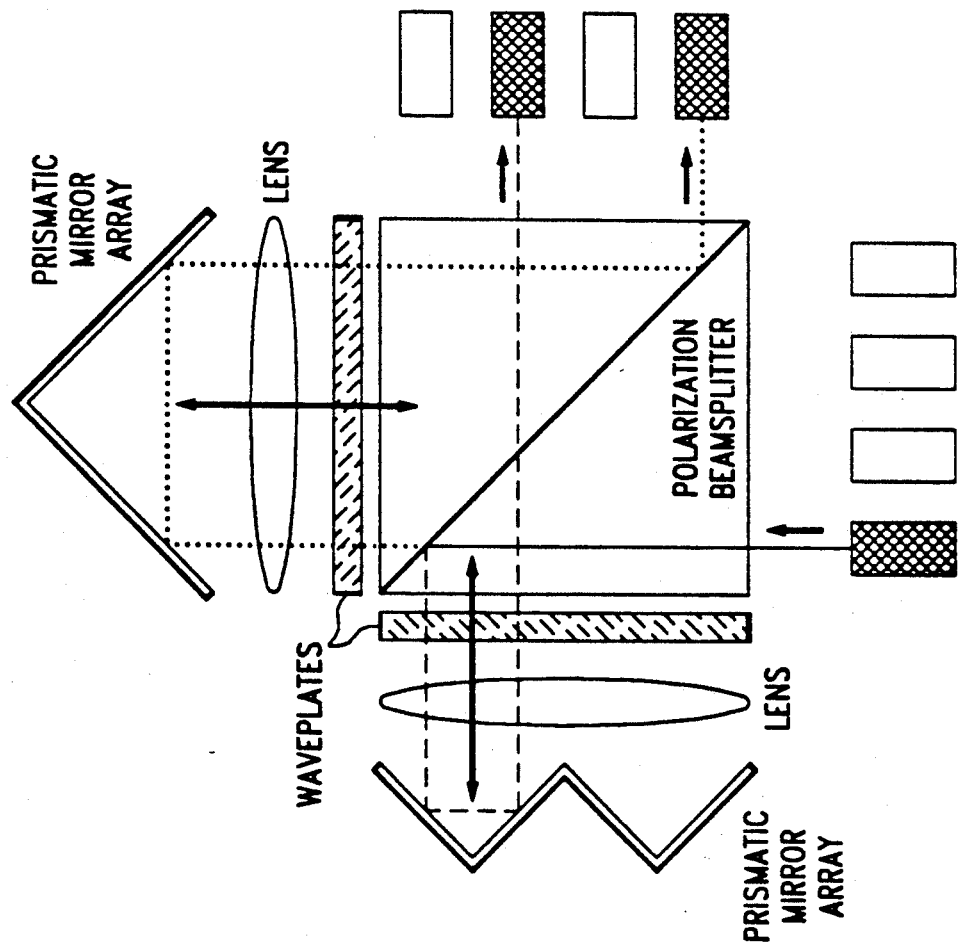
Figure 47:
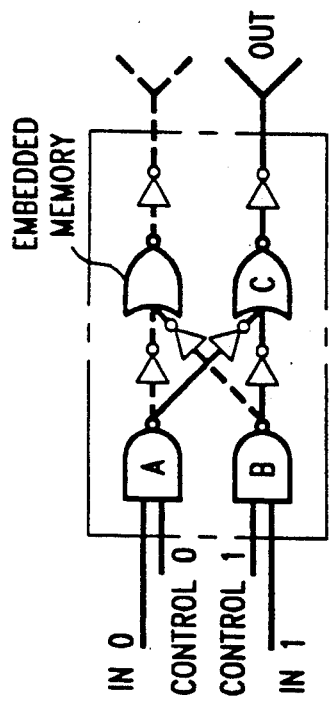
Figure 46:
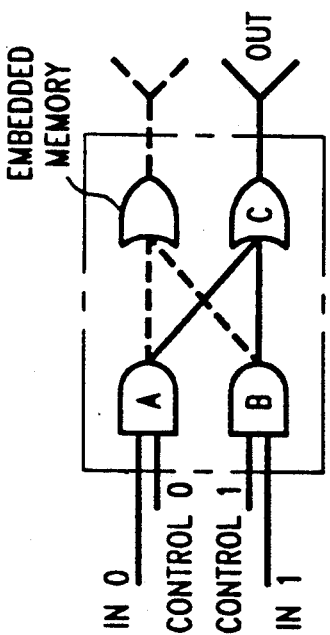
Figure 48:
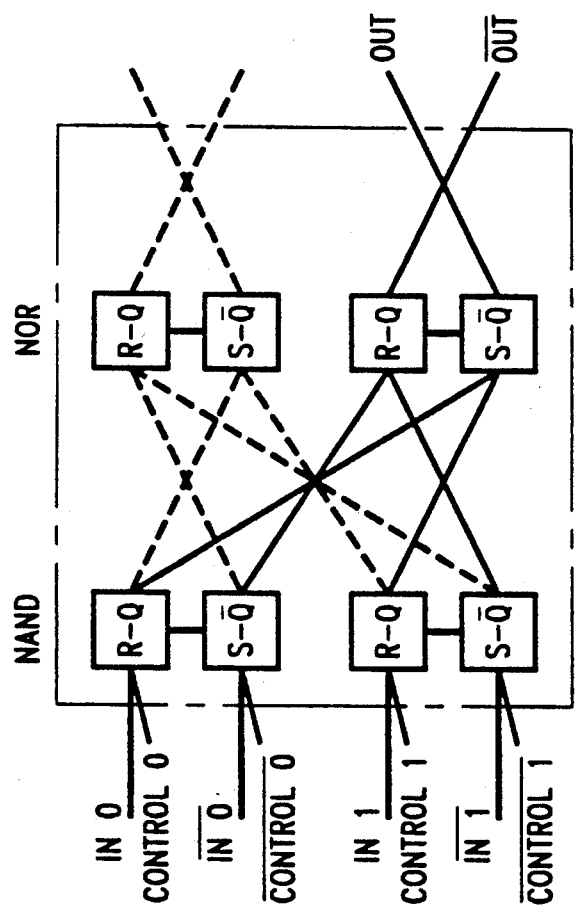
Figure 49:
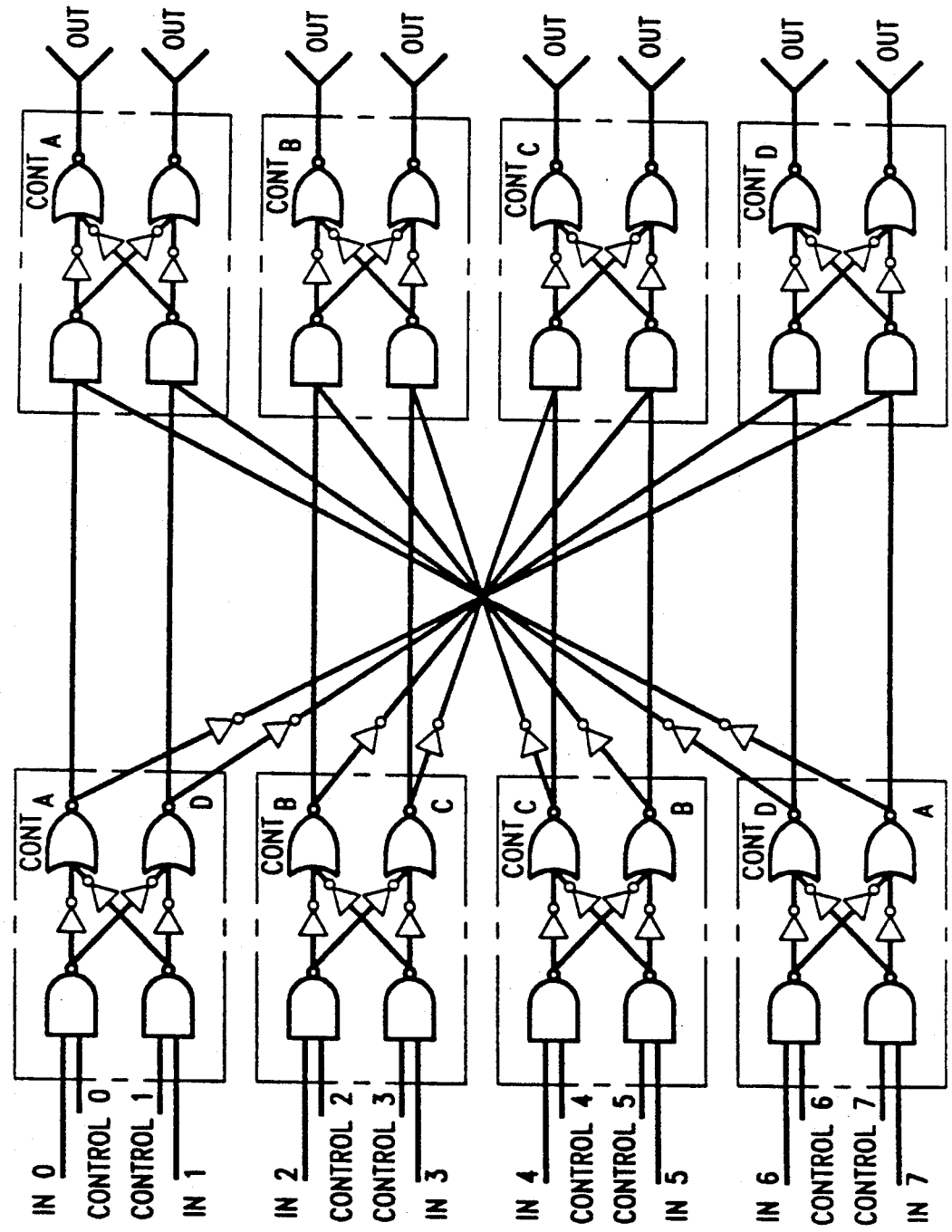
Figure 50:
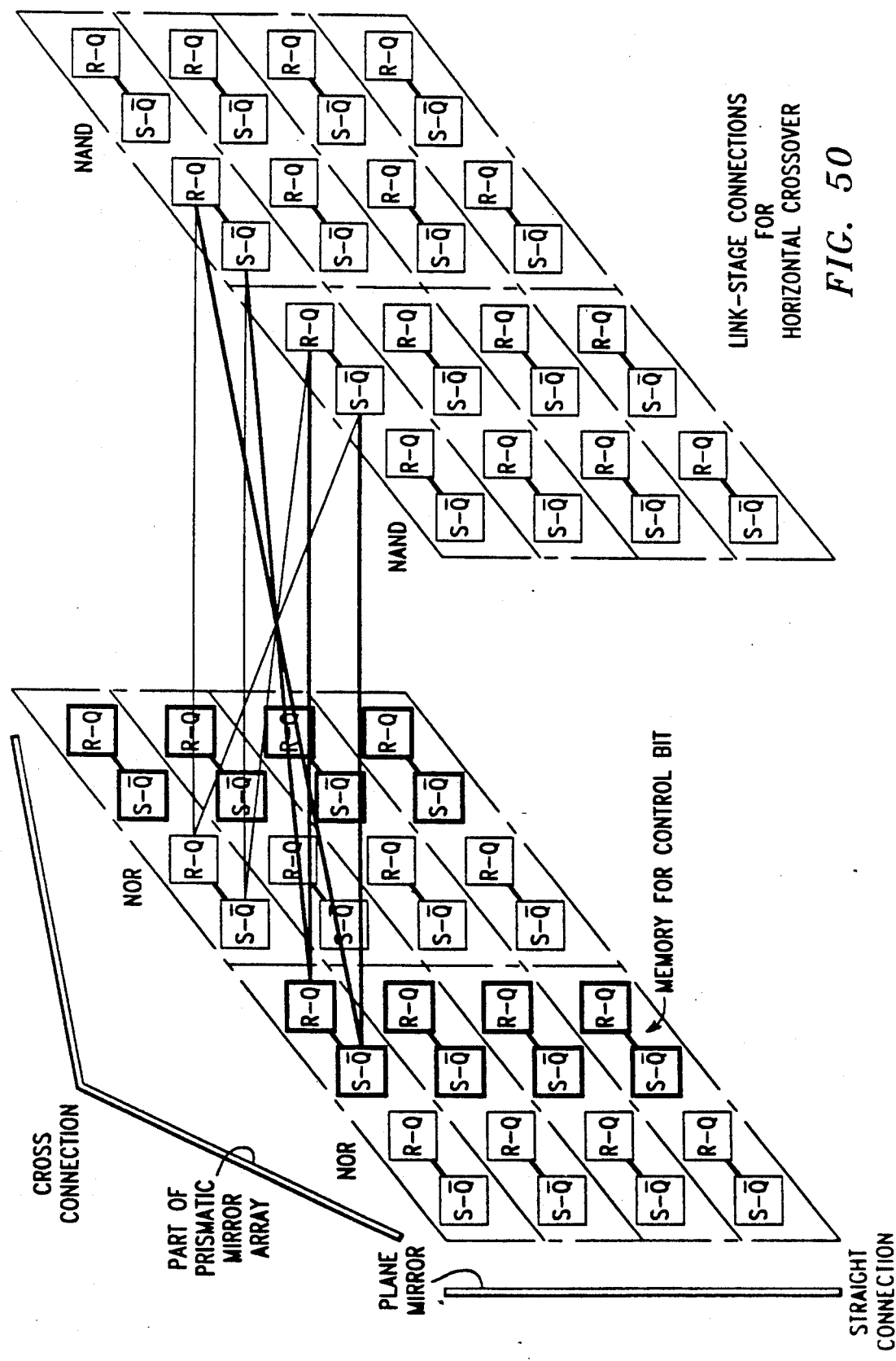
Figure 51:
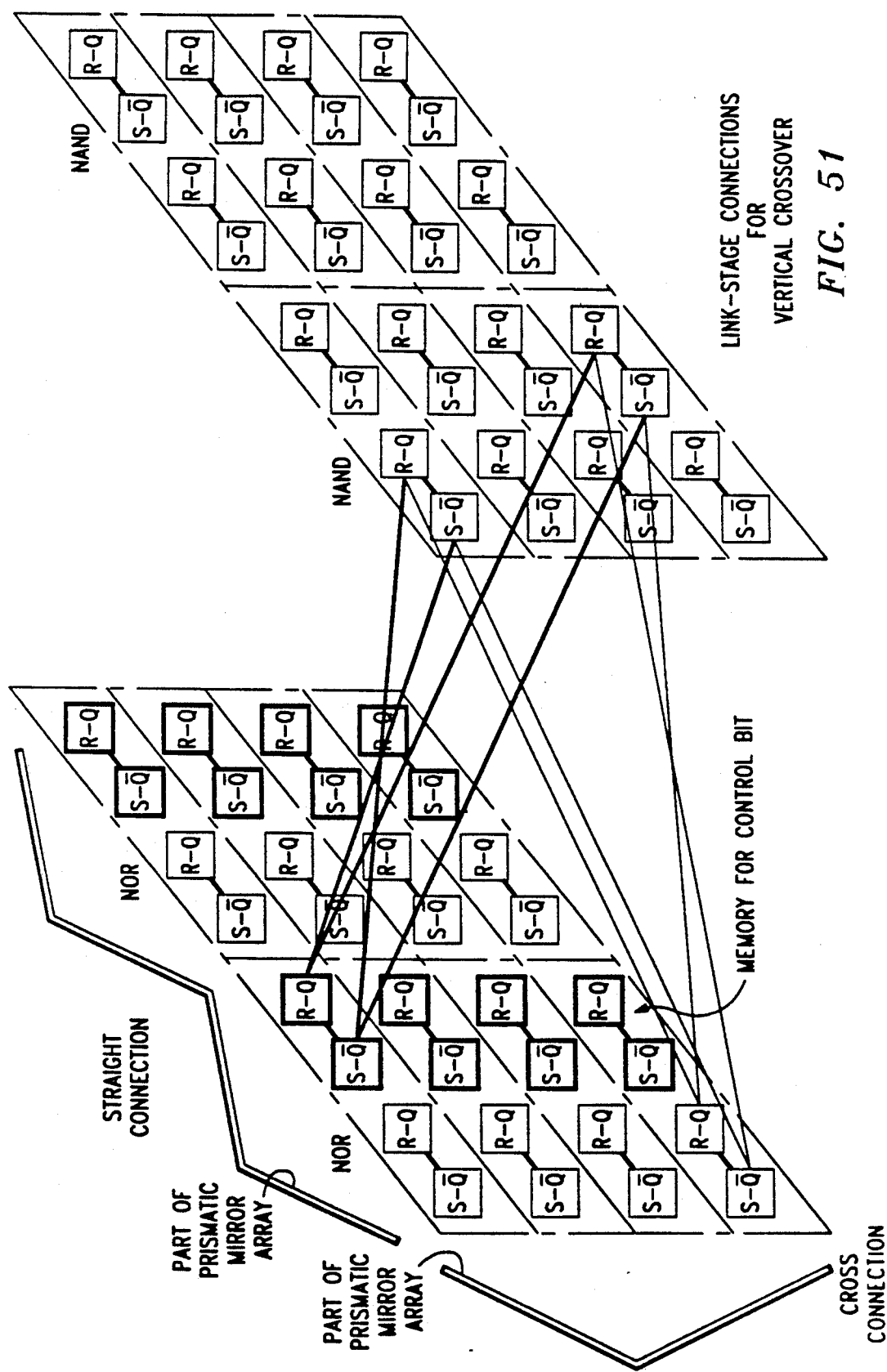
Figure 52:
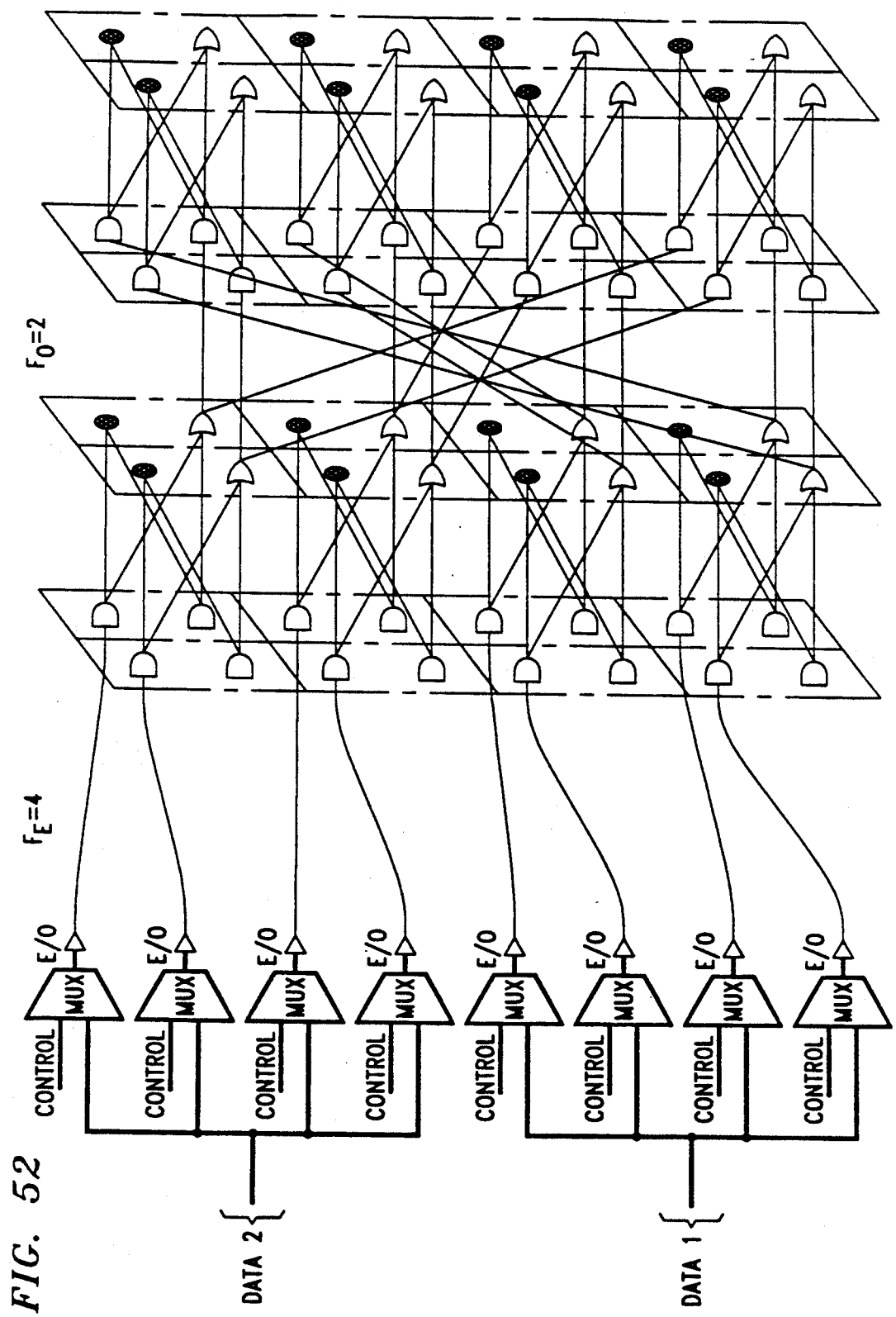
Figure 53:
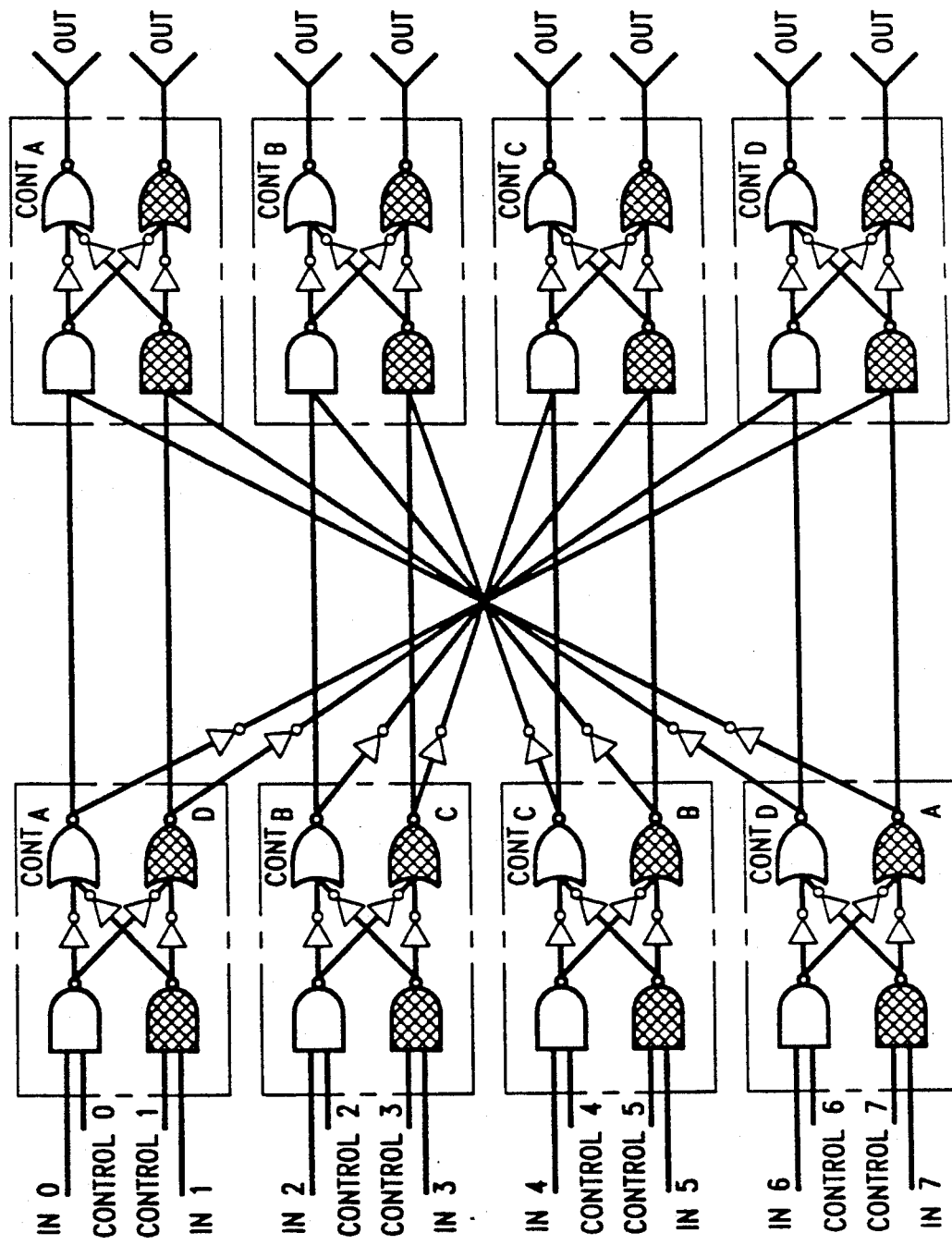
Figure 55:
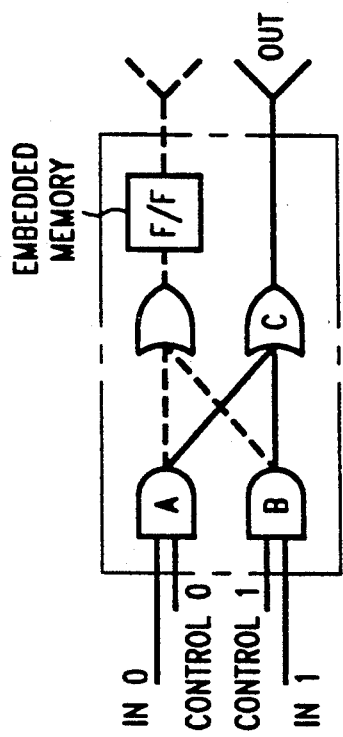
Figure 54:
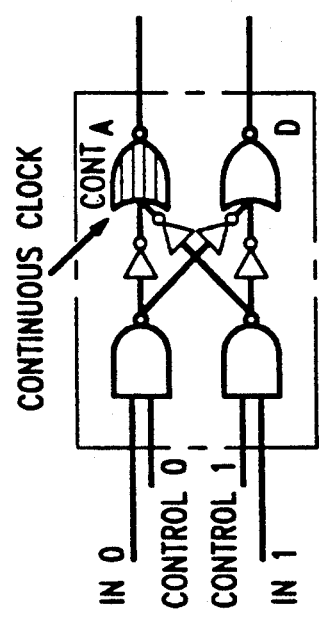
Figure 56:
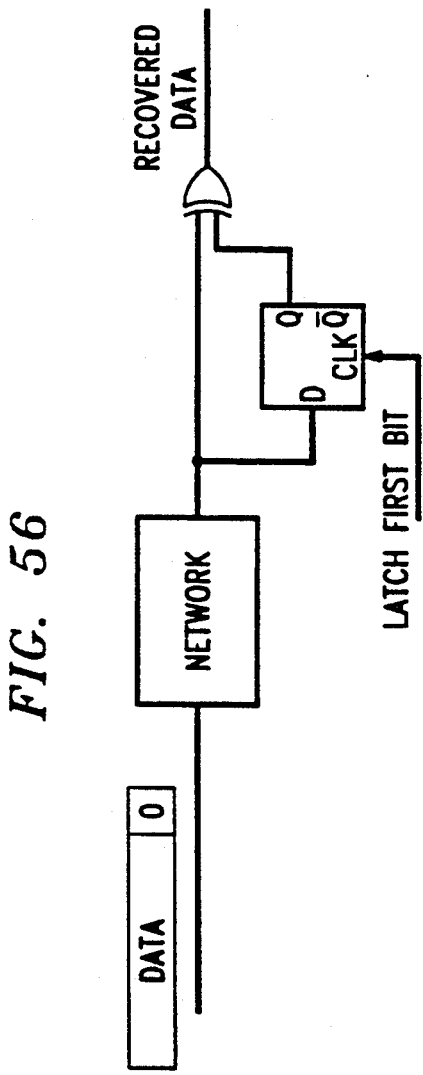
Figure 57:
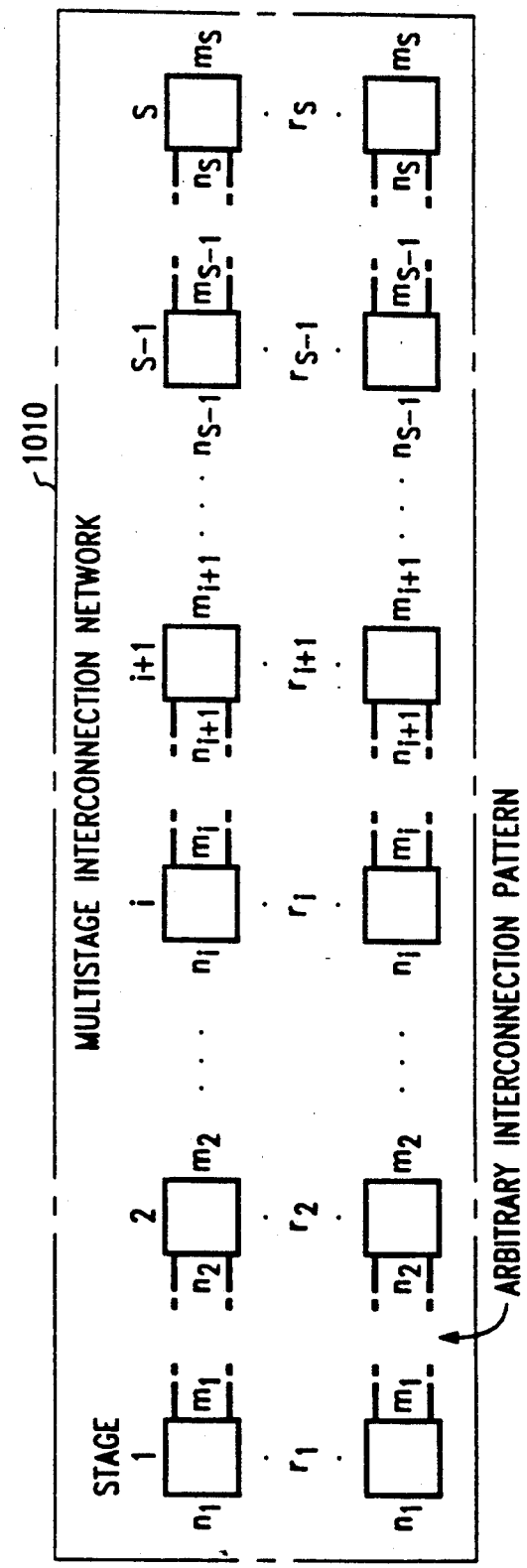

FIGS. 9-11, arranged in accordance with FIG. 8, present in greater detail the optical setup shown only functionally in FIG. 1;

FIG. 12 is a detailed diagram of an output line circuit included in the photonic system of FIG. 1;

FIGS. 14-16, arranged in accordance with FIG. 13, present in greater detail three consecutive optical hardware modules in the photonic system of FIG. 1;

FIGS. 18-20, arranged in accordance with FIG. 17, present the three-dimensional crossover network topology implemented in the photonic system of FIG. 1;

FIG. 21 is a functional diagram of a prior art optical system using spatial light modulators (SLMs) for control;

FIG. 22 is a diagram illustrating the operation of a time-multiplexed switch using guard bands between packet or time-slot intervals;

FIG. 23 is a functional diagram of a prior art optical system known as a self-routing Starlite packet switch;

FIG. 24 is a diagram of an illustrative network topology for a prior art system comprising expansion, a perfect shuffle equivalent network, and concentration;

FIG. 25 is a diagram of a particular perfect shuffle equivalent network—the crossover (or half crossover) network;

FIG. 26 is a diagram of an EGS network representing an important special case of perfect shuffle equivalent networks;

FIGS. 27 and 28 illustrate the relationship between two-dimensional and three-dimensional crossover networks;

FIG. 29 is a diagram showing the fanout section, switching section, and fanin section for a particular illustrative network;

FIG. 30 is a logic gate representation of the network of FIG. 29;

FIG. 31 is a logic gate representation of a modified implementation of the network of FIG. 29;

FIG. 32 is a plot illustrating the blocking characteristics of EGS networks having different values of S(switching section stages) and F(fanin/fanout);

FIG. 33 is a representation of a network having large F and small S;

FIG. 34 is a representation of a network having small F and large S;

FIG. 35 is a functional diagram of a prior art optical system using SLMs for network control;

FIG. 36 is an AND/OR representation of an optical (2,1,1) node;

FIG. 37 is a plot illustrating the blocking characteristics of EGS networks having different values of A' (number of S-SEED arrays) and D' (array dimensionality);

FIGS. 38-40 are functional network diagrams illustrating evolutionary steps culminating in the embedded control optical network of FIG. 41;

FIG. 42 is a NAND/NOR representation of an optical (2,1,1) node;

FIG. 43 is an R-S flip-flop representation of an optical (2,1,1) node;

FIG. 44 is a diagram of the optical hardware required to provide the crossover interconnections between the two stages of S-SEEDs of an optical (2,1,1) node;

FIG. 45 is a diagram showing additional crossover interconnections provided by the hardware of FIG. 44;

FIG. 46 is an AND/OR representation of an optical (2,1,1) node where the previously unused OR gate is used as the embedded memory element of the node;

FIG. 47 is a NAND/NOR representation of an optical (2,1,1) node with embedded memory;

FIG. 48 is an R-S flip-flop representation of an optical (2,1,1) node with embedded memory;

FIG. 49 is a diagram illustrating a close up view of the crossover interconnection between four (2,1,1) nodes of one one node stage and four (2,1,1) nodes of the following node stage, with the control elements of each node indicated;

FIG. 50 is a diagram illustrating the link-stage connections for horizontal crossovers;

FIG. 51 is a diagram illustrating the link-stage connections for vertical crossovers;

FIG. 52 is a diagram illustrating the loading of control bits in an embedded control network;

FIG. 53 is a diagram illustrating the illumination by separate power(clock) laser sources of even and odd rows of the network portion of FIG. 49;

FIG. 54 illustrates the illumination by a separate continuous clock of the control NOR-gate of a NAND/NOR representation of a (2,1,1) node;

FIG. 55 is a more accurate AND/OR representation of a (2,1,1) node with embedded memory represented by a flip-flop;

FIG. 56 is a diagram of a circuit to correct for data inversion by the optical network;

FIG. 57 is a diagram of a multistage interconnection network (MIN); and

Figure 58:
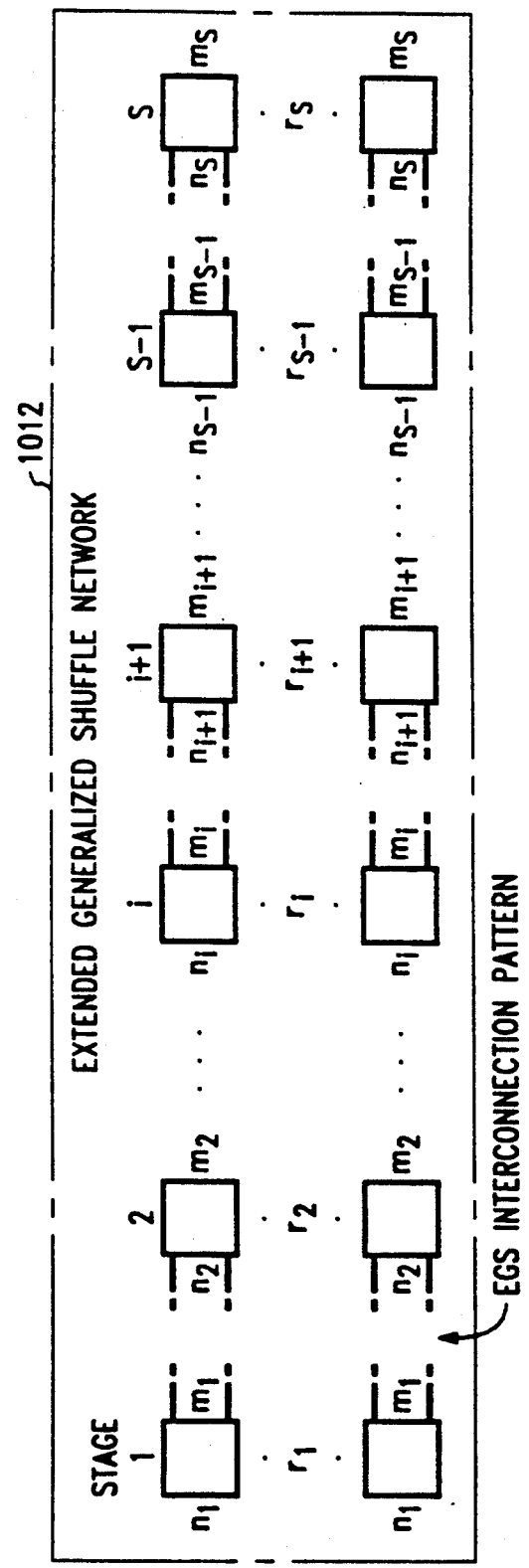

FIG. 58 is a diagram of a particular type of MIN, referred to herein as an extended generalized shuffle (EGS) network.

DETAILED DESCRIPTION

The detailed description which follows describes various principles needed to implement photonic system 10 (FIG. 1). The principles are discussed particularly with respect to the embedded control network of FIG. 41. In a system based on embedded control, the use of SLMs is avoided without requiring increased complexity within the switching node. This is accomplished by performing the path hunt processing within an electronic centralized controller, and prepending the results of the path hunt to the transmitted data at the inputs of the network and injecting them into the network on the same links that carry the transmitted data. A single S-R latch is used in each EGS switching node to store the results of the path hunt processing.

Background on EGS Networks

Before discussing the hardware requirements within photonic EGS networks based on embedded control, a brief description of general EGS networks is provided. EGS networks are a broad class of multi-stage interconnections networks defined in the referenced Cloonan application 07/349,008. We will limit our considerations to an N-input, N-output EGS network containing a fanout section, a switching section, and a fanin section (FIG. 24). We will also limit our considerations to networks containing 2-input, 2-output switching nodes. Every node-stage in the switching section thus contains NF/2 2-input, 2-output switching nodes. (Note: The exact functionality of the 2-input, 2-output switching node will not yet be specified. It could vary from a (2,1,1) node defined later herein to a 2-module defined in the referenced Cloonan application 07/349,008). The fanout section at the input end of the network fans out each of the N inputs to F links which appear at the input to the switching section. As a result, there are NF links entering and leaving the switching section. The switching section, in the center of the network, contains S node-stages, and each node-stage is interconnected to the previous stage and the following stage by an interconnection which is topologically equivalent to the perfect shuffle. The fanin section, which is located at the output end of the network, groups together sets of F links which are leaving the switching stage, and it fans them into one of the N outputs.

It is assumed herein that three-dimensional crossover interconnections are used to implement the optical EGS network. FIGS. 25 and 26 show two different 2D implementations of an EGS network with N=4, F=2, and S=4. The network of FIG. 25 uses crossover interconnections, while the network of FIG. 26 uses shuffle interconnections. FIGS. 25 and 26 show how the nodes in a 2D implementation of the crossover network can be re-labeled to produce the same connectivity that is found in a 2D implementation of the omega network (which uses shuffle interconnections). It should be noted that the shuffle interconnections are physically the same from link-stage, while the crossover interconnections have a crossing connection that varies from link-stage to link-stage. FIGS. 27 and 28 show how the nodes in a 2D implementation of the crossover network can be re-arranged using folding techniques to produce a 3D implementation of the crossover network. All of the crossing connections that pass through the fold line in the 2D implementation become vertical connections in the 3D implementation, while all of the other connections remain horizontal. The 3D implementation is better suited for the 2D arrays of optical logic devices that would be used in an optical implementation of the EGS network.

One way to design the various stages of an EGS network is shown in FIG. 29, where 2-input, 2-output switching nodes are used at the junctions within the fanout section and fanin section as well as within the switching section. It can be shown that the crossover interconnection can also be used in the fanout and fanin sections if appropriate spacing are used between the used input locations and the used output locations within FIG. 29. When the network is constructed in this fashion, each stage in the fanout section (fanin section) provides a fanout (fanin) of 2, so $\log_2 F$ stages are required to produce a fanout (fanin) of F within the fanout section (fanin section). Thus, the total number of node-stages (T) required in a network with S stages in the switching section and a fanout (fanin) equal to F is given by $S + 2\log_2 F$. The particular network in FIG. 29 has the parameters N=4, F=4, and S=2, so the total number of node-stages is 6. If the blocks in FIG. 29 are actually implemented as (2,1,1) nodes, then the blocks in FIG. 29 can be replaced by Boolean logic (2 AND gates and an OR gate), as shown in FIG. 30. When the hardware cost is described in terms of stages of logic gates, it can be seen that the design of FIG. 30 requires A stages of logic gates, where A is given by:

$$A = 2S + 4\log_2 F. \quad [1]$$

In the particular network of FIG. 30 where N=4, F=4, and S=2, the number of logic gate stages can be calculated to be A=12. Hardware savings can be realized if the fanout and fanin sections are implemented using simple OR gates. However, the first stage within the fanin section must have (2,1,1) switching nodes to permit selection of the path that will be routed to the output. In addition, it can be shown that the crossover interconnection can also be used in the fanout and fanin sections if appropriate spacings are used between the used input locations and the used output locations within FIG. 30. All of these changes are shown in FIG. 31, and these changes reduce the number of logic gate stages (A) to:

$$A = 2S + 2\log_2 F + 1. \quad [2]$$

In the particular network of FIG. 29, the number of logic gate stages can be calculated to be A=9.

If 2-modules are used instead of (2,1,1) nodes, then each stage in FIG. 29 would require only are array of logic gates, so the total number of logic gates required would be given by:

$$A = S + 2\log_2 F. \quad [3]$$

In the particular network of FIG. 29 (based on 2-modules), the number of logic gate stages can be calculated to be A=6.

Thus, it is apparent that a network based on 2-modules will require less logic gate arrays than a similar network based on (2,1,1) nodes, but the network based on 2-modules may have a higher blocking probability unless F and S are modified. As an example, it has been shown that an N=256 EGS network with a blocking probability of less than $10^{-8}$ will require F=8 and S=10 if implemented using (2,1,1) nodes, but it will require F=16 and S=9 if implemented using 2-modules. In terms of S-SEED arrays, the network based on (2,1,1) nodes will require 27 64×32 arrays of S-SEEDs, while the network based 2-modules will require 17 64×32 arrays of S-SEEDs. As a result, for a particular blocking probability, hardware costs are typically decreased if a 2-module implementation is used in place of a (2,1,1) node implementation.

The exemplary embodiment (photonic system 10 (FIG. 1)) of the present invention where control is embedded is an EGS network is implemented using (2,1,1) nodes. Despite the decreased hardware requirements that result from the use of 2-modules, the operational benefits resulting from the use of embedded control justify the additional hardware costs required for (2,1,1) nodes in some applications. In addition, the complexity of the entire system may be simplified by the use of embedded control, since the use of SLM's tends to complicate the system optics.

The EGS class of networks includes both blocking and non-blocking networks. For an N-input, N-output EGS network ($N = 2^k$, k a positive integer) constructed with S stages of (2,1,1) switching nodes in the switching section and with a fanout and fanin of F, it has been shown that for point-to-point connections, the network will be strictly non-blocking if:

$$F \geq (0.75)^{S \bmod 2} \times 2^{k+1-\lfloor s/2 \rfloor} - 2^{k-s} + \lfloor s/k \rfloor \left( 2(s-k) - 1 + 2^{k-s} - \left\lfloor \frac{2^{s-k}}{(0.75)^{S \bmod 2} \times 2^{k-s/2} + s - k - 1 + 2^{s-k-1}} \right\rfloor \right) \quad [4]$$

This inequality is derived from the more general equation:

$$\frac{F2^S}{N} + \left\lfloor \frac{2^S}{FN} \right\rfloor \geq 2^{\frac{S-1}{2}} \left( 2^{\frac{3-P(S)}{2}} + P(S) \right) + 2 \left\lfloor \frac{2^S(S - \log_2 N - 1)}{N} \right\rfloor + 1, \quad [5]$$

where [X] denotes the largest integer less than or equal to X, and $$P(S) = \begin{cases} 0, & \text{for even values of } S \\ 1, & \text{for odd values of } S \end{cases} \quad [6]$$

The number of stages S can be any number between 0 and infinity, but increasing S beyond $2\log_2 N - 2$ has little effect on the minimum fanout required for a strictly non-blocking network. As an example, if the number of inputs (outputs) is fixed at N=256, then one can solve the inequality for the minimum value of F required when S is varied between 0 and $2\log_2 N - 2 = 14$. The first two columns of Table 1 indicate required minimum values of F for k=8 (N=256) and for $0 \leq S \leq 2k - 2 = 14$, as given by Eq. 4.

| Number of switching section stages S | Minimum required fanout (based on Eq. 4) F | Minimum required fanout (3D impl.) F' | Number of required S-SEED arrays A' | Required dimensions of S-SEED arrays D' |
|---|---|---|---|---|
| 0 | 256 | 256 | 18 | 256 × 256 |
| 1 | 256 | 256 | 20 | 256 × 256 |
| 2 | 192 | 256 | 22 | 256 × 256 |
| 3 | 160 | 256 | 24 | 256 × 256 |
| 4 | 112 | 128 | 24 | 128 × 256 |

-continued

| Number of switching section stages S | Minimum required fanout (based on Eq. 4) F | Minimum required fanout (3D impl.) F' | Number of required S-SEED arrays A' | Required dimensions of S-SEED arrays D' |
|---|---|---|---|---|
| 5 | 88 | 128 | 26 | 128 × 256 |
| 6 | 60 | 64 | 26 | 128 × 128 |
| 7 | 46 | 64 | 28 | 128 × 128 |
| 8 | 31 | 32 | 28 | 64 × 128 |
| 9 | 25 | 32 | 30 | 64 × 128 |
| 10 | 19 | 32 | 32 | 64 × 128 |
| 11 | 17 | 32 | 34 | 64 × 128 |
| 12 | 14 | 16 | 34 | 64 × 64 |
| 13 | 14 | 16 | 36 | 64 × 64 |
| 14 | 14 | 16 | 38 | 64 × 64 |

Table 1-Hardware requirements for N=256 non-blocking EGS Networks

A plot of the required fanout F vs. S is shown in FIG. 32. This plot illustrates that non-blocking EGS networks will continue to be non-blocking even if F is decreased, so long as S is increased by an appropriate amount. The network will also continue to be non-blocking even if S is decreased, so long as F is increased by an appropriate amount. As a result, non-blocking EGS networks can be built with large F and small S (FIG. 33), and they can also be built with small F and large S (FIG. 34), Thus, system designers can customize the length and width of a non-blocking EGS network to match their particular requirements.

The dark line plotted in FIG. 32 represents the boundary between a non-blocking region and a blocking region.

Hardware Requirements for an Optical Implementation of a Switching System

We will assume that S-SEEDs will be used within the optical EGS system design described herein. The design is comprised of three sub-systems: the transmission/switch interface, the controlling processor, and the switching fabric (FIG. 35). We limit the use of S-SEEDs to the switching fabric, where we can more easily exploit their advantages over electronics. The controlling processor and the the switch/transmission interface functions are left to electronics. It is interesting to note that electronics is used in this switch wherever electronic technologies are best suited, and optics is used wherever optical technologies are best suited. In particular, optics offers the advantages of large amounts of connectivity between stages; therefore optics is used after the N input signals have been fanned out to form NF signals. As a result, optics is only used in the switching fabric where the EGS network requires a large number of connections between stages.

In FIG. 35, the input data arrives on fiber transmission links and enters the incoming transmission/switch interface, where the data undergoes an O/E conversion. For simplicity within the figure, each of the M fiber transmission links is terminated on a separate electronic circuit board. All of the transmission/switch interfacing functions are provided by the electronics on the circuit board, and the data is then converted back into an optical signal. The optical signal leaves the transmission/switch interface and is directed to the EGS fabric on a single fiber that is funneled into a matrix-aligned fiber bundle. The output of the bundle is imaged through a lensing system onto the first S-SEED array within the EGS fabric. Each S-SEED array has associated with it an optical hardware module described in the referenced Cloonan application 07/349,008. Typically, an optical fabric would require several S-SEED arrays along with the corresponding hardware in the optical hardware module to provide the connections for an entire EGS network. After the optical signal is routed through the multiple S-SEED arrays and the optical hardware modules, the output of the last S-SEED array is imaged back into a matrix aligned fiber bundle which splits into several separate fibers, and each fiber carries a single data channel to an electronic circuit board where an O/E conversion again takes place. The electronic data signal is now in the outgoing transmission/switch interface where required signal conditioning (such as multiplexing to higher bit-rates) is provided. The conditioned electronic signal is then converted to an optical signal by a final E/O converter, and the optical signal is launched into an output fiber transmission link.

Control of the routing paths within the EGS fabric is provided by the electronic processor, which can receive signaling information from an out-of-band source (such as a CCS link) or from in-band signaling contained within the arriving data stream (extracted by the transmission/switch interface). During call setup, the electronic processor determines the path to be used for the incoming call, and then establishes the path by sending an electronic control signal to the spatial light modulator. The spatial light modulator contains an array of windows that can be made transparent or opaque depending on the applied electronic control signal. In a particular stage of the switch, the light from one of the laser diodes in the optical hardware module is passed through these windows and is imaged onto the S-SEED array. This modulated light becomes the control signals that determine how the data is routed through the optical EGS fabric.

An optical (2,1,1) node may be implemented using S-SEEDs operating as two AND gates and an OR gate (as shown in FIG. 36). The implementation of a (2,1,1) node shown in FIG. 36 requires a pair of S-SEED arrays, and each S-SEED array must supply two logic gates. This arrangement of two S-SEED arrays and the interconnecting optics is referred to as a node-stage. If the (2,1,1) nodes are oriented horizontally, then a (2,1,1) node uses two devices along a row of each S-SEED array and uses one device down a column of each S-SEED array. Thus, a pair of S-SEED arrays with $C_{device}$ columns of devices and $R_{device}$ rows of devices can be used to construct an array of (2,1,1) nodes with $C_{node}$ columns of nodes and $R_{node}$ rows of nodes, where $C_{node} = C_{device}/2 = R_{device}$ and $R_{node} = R_{device}$. Since $C_{device}$ and $R_{device}$ are both powers of two, $C_{node}$ and $R_{node}$ are also powers of two. The set of interconnections between two consecutive node-stages is called a link-stage.

In an EGS network, the interconnections in a link-stage are topologically equivalent to the perfect shuffle, and as previously mentioned, the crossover interconnections satisfy this requirement. In a crossover network, the total number of nodes in a particular stage is equal to a power of two. In addition, the three-dimensional implementation of the crossover network requires that the total number of nodes along any column is a power of two, and the total number of nodes along any row is a power of two. S-SEEDs are presently implemented in rectangular arrays with $R_{device}$ rows and $C_{device}$ columns, where $R_{device}$ and $C_{device}$ are both powers of two.

In an EGS network (blocking or non-blocking), the fanout F can be any positive integer, and in a non-blocking EGS network, the fanout F can be any positive integer that satisfies the inequality in Eq. 4. However, in the photonic EGS networks based on crossover networks and S-SEED devices, there are additional constraints placed on the fanout F. These constraints are a direct result of the types of connections provided by optical crossover interconnects. In addition, each of the S-SEED arrays must provide FN S-SEED devices (even though half of the devices are used only for spacing in the S-SEED arrays that operate as OR gates). This requires that the (2,1,1) nodes be arranged in a rectangular array. If we assume that the rectangular array of nodes has $2^i$ nodes in a row and $2^j$ nodes in a column (where i and j are non-negative integers), then the total number of nodes in the array is $2^i \times 2^j = 2^{i+j}$ nodes. Since each (2, 1,1) node in the switching section of the EGS network has two inputs directed at it, the total number of links entering any node-stage within the switching section of the EGS network is $2 \times 2^{i+j}$ links. Assuming that the number of input links into the fanout section of the EGS network is $N=2^m$ inputs, then the fanout F of the network is calculated as:

$$F = \frac{\text{\# links in a stage of switching section}}{\text{\# links at input of fanout section}} \quad [7]$$

$$F = \frac{2 \times 2^{i+j}}{2^m} \quad [8]$$

$$F = 2^{i+j+1-m} \quad [9]$$

Since the fanout F must be an integer greater than or equal to one, the following inequality must also be satisfied:

$$i+j+1 > m. \quad [10]$$

When this condition is satisfied, the value of F is guaranteed to be a power of 2. For a non-blocking photonic EGS network, the fanout F' must be the smallest possible value of F that satisfies both Eq. 4 and Eq. 9 while using a non-negative integer value for i and j that is valid in Eq. 10.

Once we have calculated F', we can use F' as the fanout value in Eq. 11 (derived from Eq. 2) to calculate the number of S-SEED arrays A' required to implement a non-blocking network:

$$A' = 2S + 2 \log_2 F' + 1. \quad [11]$$

Eq. 11 is similar to Eq. 2, but Eq. 11 assumes that F'/2 stages of the fanout is provided by the electronics, while the last fanout of 2 is provided by the optics. Eq. 11 also assumes that all of the fanin is provided optically. We can also use F' to determine the S-SEED array dimensionality (D') required to support that fanout in the photonic EGS network. First, since the number of links in a stage of the switching section is equal to twice of the number of nodes in a stage of the switching section, we can modify Eq. 7 as follows:

$$F = \frac{\text{\# links in a stage of switching section}}{\text{\# links at input of fanout section}} \quad [12]$$

$$F = \frac{2 \times (\text{\# nodes in a stage of switching section})}{\text{\# links at input of fanout section}} \quad [13]$$

$$F = \frac{2 \times (\text{\# nodes in a stage of switching section})}{N}. \quad [14]$$

Therefore, we can write:

$$\text{\# nodes in a stage of switching section} = \frac{F \times N}{2}. \quad [15]$$

Because of the arguments presented above, we know that the nodes will be arranged in a rectangular array, the rectangular array of nodes has $2^i$ nodes in a row and $2^j$ nodes in a column (where i and j are non-negative integers), and the total number of nodes in the array is $2^i \times 2^j = 2^{i+j}$ nodes, so we can write:

$$2^{i+j} = \frac{F \times N}{2}. \quad [16]$$

Thus the dimensionality D' of the S-SEED array is given by:

$$D' = 2^i \times 2^{j+1}. \quad [17]$$

It is important to note that for a photonic EGS network implemented with crossover networks and S-SEEDs, the acceptable D' values are limited to discrete values. The smallest discrete D' value is a 1-by-1 S-SEED array. Given one of these discrete values, the next discrete value greater than the previous one is obtained by doubling one of the dimensions of the previous discrete value.

The last three columns of Table 1 contain the F' values, the A' values, and the D' values required for a non-blocking photonic EGS network with N=256 inputs. The plot given in FIG. 37 shows the S-SEED array dimensionality D' required for non-blocking operation vs. the number of S-SEED arrays A' for the photonic EGS network with N=256. The plot assumes that all of the optical fanout (fanin) is provided by multiple splits (combines) through S-SEED arrays. All EGS networks constructed with D' and A' values that are plotted above and to the right of the dark line or directly on the dark line in FIG. 37 will be non-blocking EGS networks, and all EGS networks constructed with D' and A' values that are plotted below and to the left of the dark line in FIG. 37 will be blocking EGS networks.

In general, a system designer would strive to keep both the fanout and the number of stages to a minimum to reduce the hardware costs. In the photonic implementation of the EGS network, though, it is more important to keep the fanout to a minimum than it is to keep the number of stages to a minimum. Keeping the fanout to a minimum keeps the S-SEED array dimensionality small, so the fabrication of the small device arrays becomes easier and the lens systems that image these small arrays will become less complex. In addition, smaller S-SEED arrays will require less laser power to drive each stage of the system. These facts influence the photonic EGS system designer to try to construct a system with hardware that maps to the lower half of the plot in FIG. 37 (keeping the array dimensionality D' low). If non-blocking operation is desired, then the best place to operate is at point P in FIG. 37. Operation at point P yields a non-blocking system with the lowest possible S-SEED array dimensionality ($D' = 64 \times 64$) and a moderate number of arrays ($A' = 36$).

Optical Implementation of EGS Networks Based on Embedded Control

The optical implementation of an EGS network based on embedded control evolved as follows. The basic goal of the evolution required the network to operate as a time-multiplexed space switch for either TMS or packet switch applications. (Note: The packet switch application requires packets to be buffered at the inputs, and it also requires fast path hunt operations to be performed for every packet entering the network within every packet period). This evolution and the resulting implementation will be described in this section.

Evolution of Embedded Control

The first step in the evolution required the addition of packet synchronization electronics to align the packets (time-slots) that enter the network (FIG. 38). In addition, guard band intervals are added between the packets (time-slots) to permit the switching of the SLM's when the network is reconfigured. This evolutionary step produced a network that can operate as a TMS, but its operation is limited by the relatively slow switching speed of the SLM, which forces the guard band intervals to be fairly long.

In order to circumvent this problem, the second step in the evolutionary design added a SEED memory array between the SLM and the SEED arrays that provide the switching node functionality (FIG. 39). This design effectively replaces the SLM by a double-buffered memory: the SLM can be written with control information for packet period N+1 during the entire duration of packet period N, and the SEED memory array holds the control information for packet period N for the data packets that are routed through the network during packet period N. As a result, the guard band interval can be made very short, because it only needs to be long enough to permit the parallel transfer of data from the SLM array to the SEED memory array. The addition of a second SEED array in every stage of the network complicates the optical hardware module design, so another approach was considered in the next step of the evolutionary process.

The next step in the evolutionary design merged the SEED memory array into the SEED array that provides the logic for the switching nodes, while keeping the SLM control within every stage (FIG. 40). The operation of this design is identical to the operation of the design in FIG. 39, but the additional SEED array is no longer required. At first, it may appear that the placement of the memory in with the node logic will require the optics in the system to image over a larger field of view, but the following sections will illustrate ways that the memory can be added to the node logic without increasing the image fields. The design in FIG. 40 is an implementable design, but the use of SLMs and the requirement that control information be routed to each of the node-stages in the network justify an additional evolutionary step in accordance with the present invention.

The final evolutionary step eliminated the SLMs entirely and injected all of the control information into the network through the fiber bundles at the input side of the network (FIG. 41). As a result, the input electronics must be able to multiplex the data with the control information. The network will then operate in one of two functional modes: the data passing mode and the control loading mode. During the data passing mode of operation, the data entering the network is from the transmission lines and is passed from stage to stage based on the control information that was stored in the network during the last control load period. During the control loading mode of operation, the data entering the network is from the control hardware and is passed from stage to stage along fixed, pre-determined paths. For example, in the following description, it will be shown that the control information can be passed from stage to stage using only the straight paths of the crossover interconnections. Although this approach eliminates the need for SLMs and only requires control information to be routed to the electronics at the input stage of the network, the approach requires a longer guard band interval (the control load period), because all of the control bits must be serially shifted across the network.

General Operation of Switching Systems Based on Embedded Control

The detailed operation of the network of FIG. 41 is now described. The network packets or time-slots arrive on input lines, and these packets (time-slots) must first be bit-aligned and frame-aligned before being sourced into the network fabric. This alignment can be provided at the edge of the network in the line cards. Initial implementations of the network require an O/E conversion of the data preceding the line cards, because the line cards are implemented in electronics. In addition to providing synchronization, the line cards also extract routing information from the packets (time-slots) if in-band signaling schemes are used. If an out-of-band signaling scheme is used, then the routing information is derived from an external line dedicated to control data. Whether the routing information is derived from an in-band or out-of-band source, it is ultimately routed to the electronic control unit, where fast path hunt operations are performed. While this is being done, the line cards buffer the packets (time-slots) for which paths are being calculated. The results of the path hunt operations are routed back down to the line cards, where the path control information is prepended to the packets (time-slots). CRC codes or parity bits can also be added to the packets (time-slots). Since the addition of the control information and the CRC codes may increase the overall length of the packets (time-slots), a slight speed-up of the data rate may be required when the packets are injected into the network fabric. The network is operated in one of two functional modes: the control loading mode and the data passing mode. During the control loading interval, the path control information that is prepended to the packets is routed through the network; this interval is analogous to the guard band intervals that were described above. During this interval, the network forces the data to be routed only along the straight paths within the crossover fabric. As a result, the control bit that must be stored in the memory cell for a particular node is passed into the network along the straight-line path that passes through that node. Once all of the control bits have been serially shifted across the network into their appropriate node memory cells, the network operation switches from the control loading mode into the data passing mode. During the data passing mode of operation, the data is passed through the network and is routed based on the control bits that are stored in the memory cells within the nodes. The data from each packet (time-slot) is then routed to the appropriate output port, where the control information and the CRC code is extracted from the packet (time-slot). The CRC code can then be checked, and corrupt data can be identified. If erroneous data is identified, then fault-location processes attempt to locate the fault within that particular data path so that future packets (time-slots) will not be corrupted.

Nodes in Switching Systems Based on Embedded Control

It has already been assumed that crossover interconnections are used to interconnect consecutive node-stages of (2,1,1) nodes. A single (2,1,1) node implemented with S-SEEDs is shown in FIG. 36. The unused OR gate in the output array is of particular interest, because that gate is used as the memory cell in the embedded control system illustrated in FIG. 41. FIG. 42 illustrates an equivalent circuit based on NAND gates and NOR gates (which can be implemented using S-SEED devices). The implementation in FIG. 42 requires data inversions to take place when the data is propagating from one device to another. Since dual-rail data is used in the S-SEED, the data inversions may be accomplished by crossing the two data rails. The actual connections provided for each of the data rails between S-SEEDs are shown in FIG. 43. The optical hardware required to provide the connections of FIG. 43 is shown in FIG. 44. This hardware is the optical crossover interconnect hardware that was described in the referenced Cloonan application 07/349,008. In FIG. 45, it can be seen that the crossover hardware provides more connections than those shown in FIG. 44. In fact, the crossover hardware also provides connections to the unused NOR gate in FIG. 43 (equivalent to the OR gate in FIG. 42) (which will operate as the node's memory cell) in the second stage of the (2,1,1) node. The connections provided between the S-SEEDs are re-drawn in FIG. 46, and the equivalent schematic based on NAND gates and NOR gates is shown in FIG. 47. If the data inversions that take place while the data is propagating are combined with the logic gates, then the equivalent AND-OR implementation of FIG. 48 is obtained. As a result, it becomes apparent that the unused OR gate can be accessed by either of the two inputs, so it is possible to use it as the memory cell which can hold the embedded control information for the (2,1,1) node.

Link-Stage Connections in Switching Systems Based on Embedded Control

Simple access to the memory cell is not sufficient to guarantee that the embedded control concept outlined above can be implemented. We must also show that control bits can be routed appropriately during the control loading mode and that data bits can be passed appropriately during the data passing mode. First the global connections that are provided by the link-stage crossover interconnections are examined. For example, a close-up view of the crossover interconnection between four (2,1,1) nodes of one node stage and four (2,1,1) nodes of the following node stage is shown in FIG. 49. The NOR gates in the upper right-hand corner of each (2,1,1) node are assumed to hold the control memory, and are labeled Cont A, Cont B, Cont C, and Cont D. In general, Cont x is the control bit that determines how the (2,1,1) node output labeled x will be routed in the next node-stage. For example, Cont A will control how the A bit from the bottom (2,1,1) node will be routed in the next stage. Tracing the A bit to the next node-stage, it is observed that the A bit is routed to the top input of the top (2,1,1) node and to the bottom input of the bottom (2,1,1) node. Tracing the Cont A bit to the next node-stage, the Cont A bit is also routed to the top input of the top (2,1,1) node and to the bottom input of the bottom (2,1,1) node. Thus, Cont A and A are directed at the same inputs in the following node-stage. It should also be noted that the Cont A bit is inverted in the cross path, but it is not inverted in the straight path. If Cont A is a logic "1", then the control bit will arrive (un-inverted) at the top node as a logic "1", but it will arrive at the bottom node as a logic "0". Thus, the A bit will be routed through the top node but not through the bottom node. If Cont A is a logic "0", then the control bit will arrive (un-inverted) at the top node as a logic "0", but it will arrive at the bottom node as a logic "1". Thus, the A bit will be routed through the bottom node but not through the top node. As a result, the routing of the data to desired outputs can be accomplished by loading appropriate control bits into the memory cells. In general, two requirements must be satisfied in order for the embedded control bits to effectively route the data: (1) a particular control bit in node-stage i must arrive at the same two node inputs in node-stage i+1 as the data that it controls, and (2) the control bits that propagate down one path must be inverted while the control bits that propagate down the other path must be non-inverted.

Figure 3:
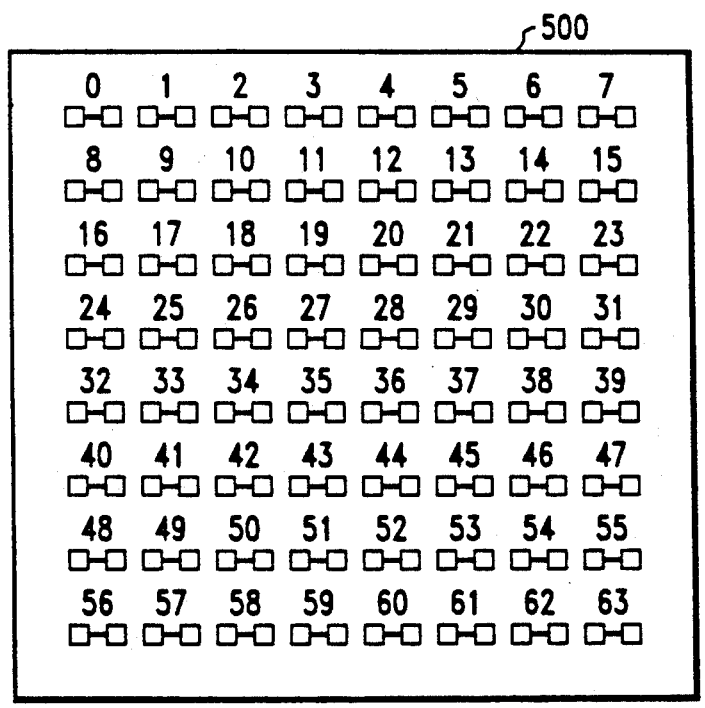
FIG. 3 is a diagram of an array of symmetric self electro-optic effect devices (S-SEEDs) used in the photonic system of FIG. 1.
Figure 4:
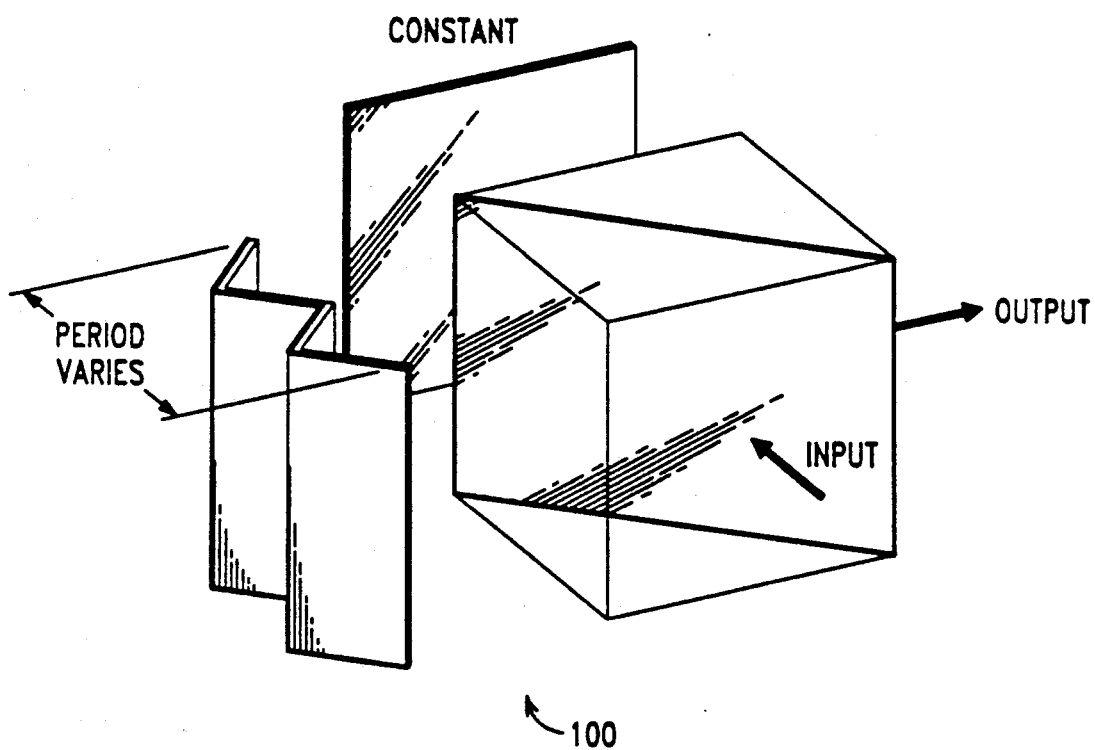
FIGS. 4 and 5 illustrate the variations between the optical crossover interconnects for horizontal and vertical crossover stages in the photonic system of FIG. 1.
Figure 5:
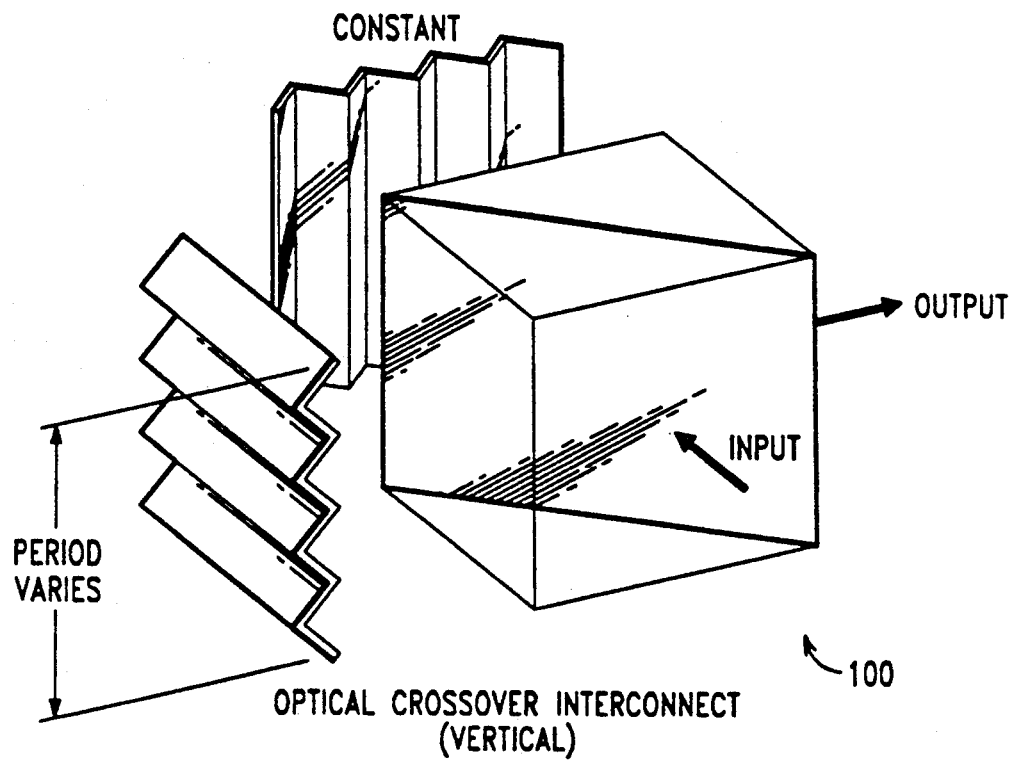
Figure 6:
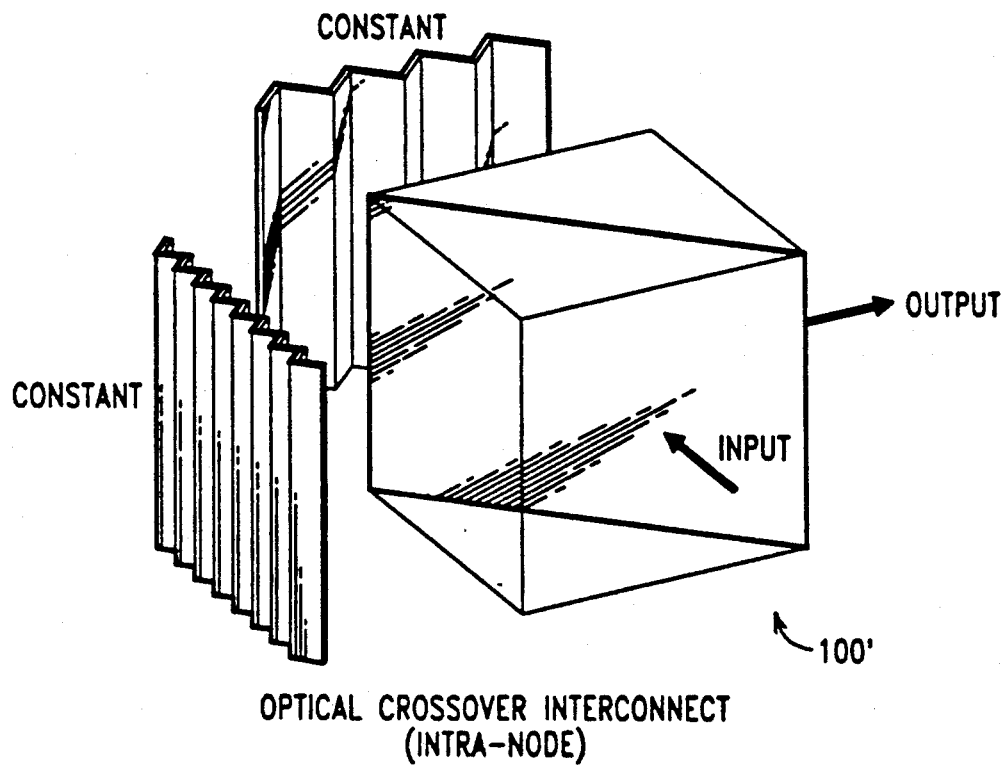
FIG. 6 illustrates the optical crossover interconnect used to interconnect the two consecutive optical hardware modules that implement a node-stage in the photonic system of FIG. 1.
Figure 7:
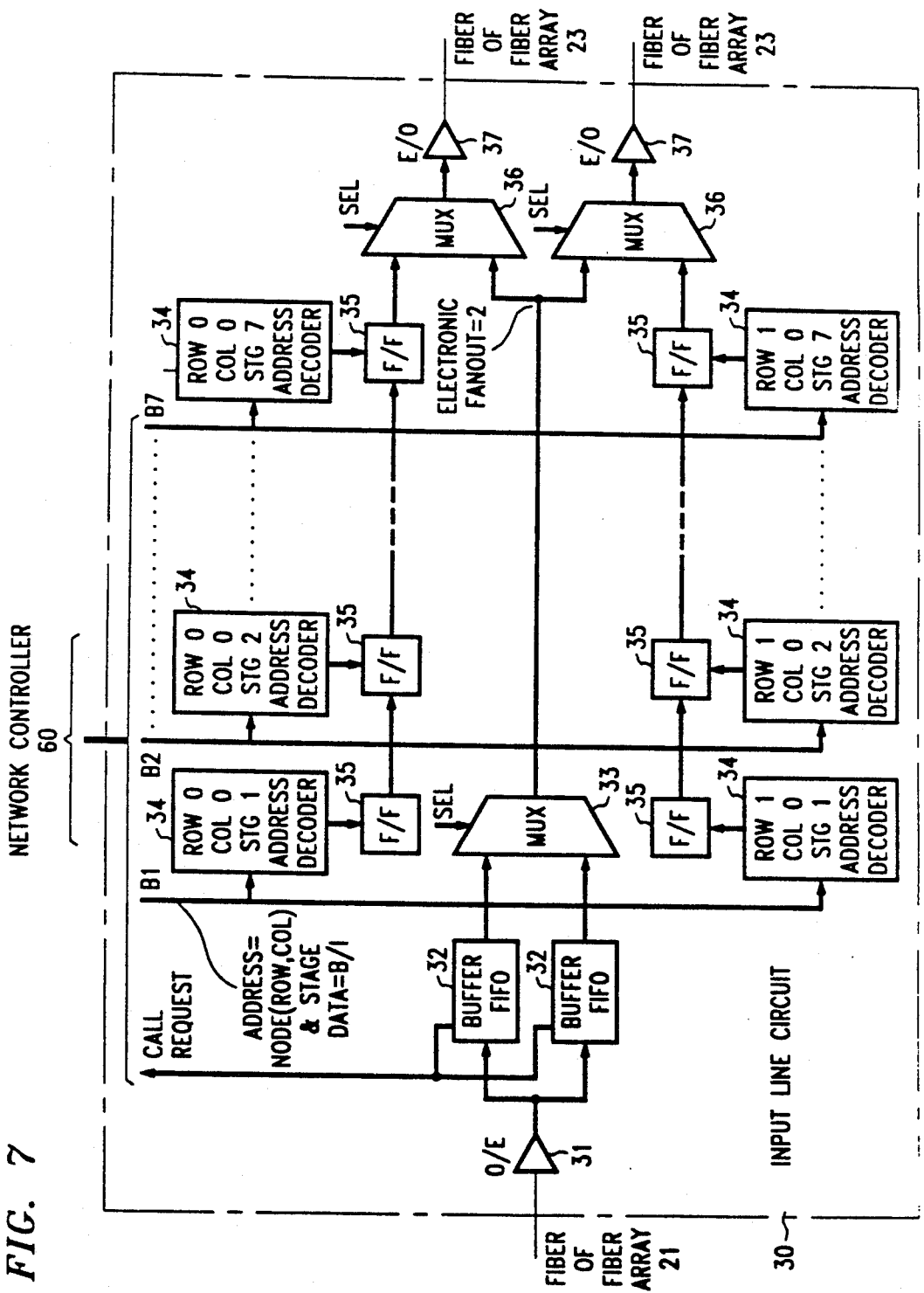
FIG. 7 is a detailed diagram of an input line circuit included in the photonic system of FIG. 1.

The above argument was presented only for a 2D crossover network. Since the exemplary embodiment of photonic system 10 (FIG. 1) is implemented using a 3D crossover network, the two requirements listed above must also be met for both the horizontal and the vertical crossover connections that exist within the 3D networks. Without loss of generality, assume that the S-SEEDs are oriented horizontally (FIG. 3) within the S-SEED arrays- i.e., the line connecting the two photodiodes in each S-SEED is horizontal. If this is the case, then horizontal crossover connections are identical to those shown in FIG. 49, except that they are implemented in parallel across all of the rows in the link-stage (FIG. 50). As shown in FIG. 50, a prismatic mirror array is used to provide the horizontal cross connection (which inverts the control bits), while a plane mirror is used to provide the straight connections (which do nor invert the control bits). As a result, the two requirements listed above are satisfied for the horizontal crossover connections. For vertical crossover connections, slight modifications are required in the optical hardware to guarantee that the two requirements listed above are satisfied. As shown in FIG. 51, a prismatic mirror is used to provide the vertical cross connection (which does not invert the control bits). However, a small granularity prismatic mirror array is also used to provide the "straight" connection (which inverts the control bits). As a result, the "straight" connections are not, strictly speaking, straight connections-they are shifted connections. However, they do connect to the node directly in front of the node from which they originated; they are "straight" from a node connectivity point of view. Analysis of the connections in FIG. 51 indicates that the two requirements listed above are satisfied for the resulting vertical crossover connections.

Loading and Storing of Control Bits in Switching Systems Based on Embedded Control The operation of a photonic EGS network based on embedded control during the control loading mode differs from its operation during the data passing mode. In fact, the requirements placed on the system as a result of the control bit loading have a large impact on the overall system hardware requirements and on the system's operating characteristics. For example, since distinct control bits must be routed to each of the rows and columns in the network, all of the EGS fanout is provided electronically except for the final binary split that occurs in the first crossover interconnection. As a result, the need for control loading requires that $F_{elect}=F/2$, while $F_{opt}=2$ for the fanout. (Note: $F_{elect}$ is provided in the electronic line card, while $F_{opt}$ is provided in the optical EGS network). Because of this requirement, relatively large fiber bundles are required at the input of the network. In addition, the driver circuitry for each fiber in the fiber bundle requires a multiplexer to combine the control bits with the data bits, as shown in FIG. 52. The inputs in FIG. 52 are assumed to be single rail inputs; they require the first stage of S-SEEDs to be provided with a preset signal. (Note: The preset may be asserted in synchronization with the data input.) If the preset signal is undesirable in the first stage, then dual rail inputs can be passed through the fiber bundle, but the number of fibers within the bundle will double.

Since most of the fanout section is implemented in electronics, one might consider also moving the fanin section into the electronics (resulting in a reduction of required S-SEED arrays). This can be done, but it requires routing information to be routed to the output line cards where the fanin would be performed because all of the lines being fanned into the line card will contain active data. As a result, line card implementations would be more complicated because the line cards become, in effect, part of the switching fabric.

The overall clock rate of the pulsing clock lasers in the system must be slightly increased to accommodate the control loading because the network must pass both the data bits and the control bits within a single time-slot interval. As an example, assume the period of a single bit in the network is given by $T_{bit}$. If the network has Y S-SEED arrays, then Y control bits must be clocked across the network during the control loading interval; the amount of time required to load the control bits is given by $YT_{bit}$. If a single time-slot (packet) contains P data bits, the amount of time required to pass the data bits is given by $PT_{bit}$. The overall network clock speed-up is then given by:

$$\text{Speed-up} = \frac{Y+P}{P}. \qquad [18]$$

Thus, efficient operation of embedded control networks requires that $P>>Y$.

During the control loading mode, the control bits must be passed along the straight paths from the input edge of the network to the output edge of the network. In order to provide this function, only the clock lasers that drive devices in rows that have control bit memories are enabled, and all other clock lasers are disabled. This is illustrated in FIG. 53, where the non-cross-hatched devices receive clock signals, while the cross-hatched devices do not. Thus, only clocks associated with even-numbered rows are enabled, while clocks associated with odd-numbered rows are disabled. Analysis of FIG. 53 indicates that the input contro bits are passed in shift-register fashion from device to device along only the straight paths in the EGS network. In addition, the control bits are only passed along the straight paths within the (2,1,1) nodes. The enabling of clocks in even numbered rows while disabling clocks in odd-numbered rows can be accomplished in several ways. One of the techniques requires one laser diode to drive all of the even-numbered rows, and a different laser diode to drive all of the odd-numbered rows. Since the S-SEED devices are operated as logic gates and will also require a separate laser diode for presets, each S-SEED array in the exemplary system must have three laser diodes to drive it.

Another result of the manner in which the control bits are loaded into the network is that the electronic centralized network controller must route the appropriate control bits to each line card that drives the control bits into the fiber bundle. This requires a fixed, predetermined permutation of the control bits for all of the network paths that is provided, for example, by hardware in the centralized controller.

Routing of Data Bits in Switching Systems Based on Embedded Control

When the EGS network is placed in the data passing mode of operation, the modulation of the clock lasers is again modified. The single (2,1,1) node shown in FIG. 54 illustrates that three of the logic gates within the node are driven by a pulsed clock laser during the data passing interval, while the fourth logic gate (the control bit memory) must be driven by a CW laser during the data passing interval. Because of this, the logic circuit of FIG. 46 would more accurately represent an optical (2,1,1) node with embedded control if a flip-flop were inserted after the upper right OR-gate as a control bit storage element as shown in FIG. 55. If the power in the CW laser on the control bit memory is much greater than the power of the arriving data signals, then the data signals will be effectively "washed out" by the CW laser and the control bit stored in the memory will not be modified by the data signals. The use of different laser diodes for even-numbered rows and odd-numbered rows permits the clock on the control bit memory to be continuously enabled while the other clock lasers are pulsed.

The binary data that is routed through an EGS network based on embedded control is inverted in some of the branches of the crossover and not inverted in other branches of the crossover. Depending on the path that the data takes through the network, it may or may not arrive at the output port in its original form- i.e., it may be inverted. Although the electronic centralized network controller that performs path hunt could calculate the ultimate sense (inverted or non-inverted) of the data, this information would then have to be routed to the output line cards to correct the sense of the data (if required). Another technique takes advantage of the synchronous nature of the network and the fact that all of the time-slots (packets) must be frame-aligned as they propagate through the network. If a single bit is prepended to each time-slot (packet) at the input line cards of the network, and if that bit starts out as a logic "0", then the output line cards can latch that bit when it arrives at the output. If the latched bit is a logic "0", then the data propagated through the network without being inverted and no corrections are required. However, if the latched bit is a logic "1", then the data was inverted as it propagated through the network, so the entire time-slot (packet) must be inverted. The circuitry shown in FIG. 56 may be used to correct the sense of the output data within each output line card.

The use of embedded control has another very important implication on the routing of data. Since the data leaving a (2,1,1) node can be routed along the straight connection or along the cross connection (but not both), multi-casting from a single input port to multiple output ports cannot be provided within the embedded control EGS switching fabric. Since this is an undesirable condition, one way to partially remedy the problem takes advantage of the fact that the electronic fan-out within the input line cards can be used to inject up to $F_{elect}$ copies of each input into the photonic EGS fabric. Since $F_{elect}$ will typically be equal to $F_{tot}/2$, multi-casting to $F_{tot}/2$ outputs can be provided by the implementation described above.

Definitions

The following definitions from the referenced Cloonan application 07/349,008, are included here for convenient reference. A multistage interconnection network (MIN) 1010 is shown in FIG. 57 and is defined by the following five conditions:

(1) a MIN has some arbitrary number S stages of nodes, (2) there are $r_i$ nodes in stage i, each having $n_i$ inputs and $m_i$ outputs, (3) nodes in different stages may have different values of $n_i$ and $m_i$, (4) for $1 \leq i \leq S-1$, the outputs of nodes in stage i are connected (via links) to the inputs of nodes in stage i+1, and (5) $r_i m_i = r_{i+1} n_{i+1}$ for $1 \leq i \leq S-1$.

An extended generalized shuffle (EGS) network 1012 is shown in FIG. 58. An EGS network is a MIN with a particular specified link interconnection pattern. In any stage i the nodes are numbered consecutively from 0 to $r_i - 1$ and the outputs on a particular node are numbered consecutively from 0 to $m_i - 1$. The outputs of the stage i nodes are then numbered consecutively from 0 to $r_i m_i - 1$; output $o_i$ on node $x_i$ is numbered $x_i m_i + o_i$. The EGS interconnection pattern is stated as follows: stage i output $x_i m_i + o_i$ is connected to node $(x_i m_i + o_i)_{mod\ r_{i+1}}$ in stage i+1. This interconnection pattern assigns links consecutively to nodes in the next stage (the so called perfect shuffle).

A multistage interconnection network (MIN) G is said to be a perfect shuffle equivalent network if either of the following two conditions holds.

Condition 1

For every stage i of G there exists a one-to-one mapping $\phi_i$ from the $r_i$ stage i nodes of G onto the integer set $\{0,1,\ldots,r_i-1\}$ such that node $\alpha$ in stage i of G is connected to node $\beta$ in stage i+1 of G if and only if $$\phi_{i+1}(\beta)\epsilon\{(\phi_i(\alpha) \times m_i + o_i)_{mod\ r_{i+1}}:o_i\epsilon\{0,1,\ldots,m_i-1\}\}.$$

Condition 2

For every stage i of G there exists a one-to-one mapping $\Psi_i$ from the $r_i$ stage i nodes of G onto the integer set $\{0,1,\ldots,r_i-1\}$ such that node $\beta$ in stage i+1 of G is connected to node $\alpha$ in stage i of G if and only if $$\psi_i(\alpha)\epsilon\{(\psi_{i+1}(\beta) \times n_{i+1} + i_{i+1})_{mod\ r_i}:i_{i+1}\epsilon\{0,1,\ldots,n_{i+1}-1\}\}.$$

Note that an EGS network is a perfect shuffle equivalent network in that Condition 1 holds when each $\phi_i$ is simply the identity mapping. Let $$C_1 = \{\phi_i:i\epsilon\{1,2,\ldots,S\}\}$$

represent a set of S mapping $\phi_i$ satisfying Condition 1 and let $C_2 = \{\psi_i:i\epsilon\{1,2,\ldots,S\}$ represent a set of S mappings satisfying Condition 2.

An expanding means is said to connect each of the N inlets of G to multiple inputs of the first stage nodes of G in a perfect shuffle sustaining pattern if either of the following two conditions holds.

Condition 1e $C_1$ exists, $\dfrac{n_1 r_1}{N} = F,$ an integer, and there exists a one-to-one mapping $\phi_I$ from the N inlets of G onto the integer set $\{0,1\ldots,N-1\}$ such that inlet $\alpha$ is connected to node $\beta$ in stage 1 of G if and only if $\phi_1(\beta)\epsilon\{(\phi_I(\alpha) \times F + o_I)_{mod\ r_1}:o_I\{0,1,\ldots,F-1\}\}$, where $\phi_1\epsilon C_1$.

Condition 2e $C_2$ exists, $\dfrac{n_1 r_1}{N} = F,$ an integer, and there exists a one-to-one mapping $\Psi_I$ from the N inlets of G onto the integer set $\{0,1,\ldots,N-1\}$ such that node $\beta$ in stage 1 of G is connected to inlet $\alpha$ of G if and only if $\psi_I(\alpha)\epsilon\{(\psi_1(\beta) \times n_1 + i_1)_{mod\ N}:i_1\epsilon\{0,1,\ldots,n_1-1\}\}$, where $\psi_1\epsilon C_2$.

A concentrating means is said to connect multiple outputs of the last stage S of nodes of G to each of the M outlets of G in a perfect shuffle sustaining pattern if either of the following two conditions holds.

Condition 1c $$C_1 \text{ exists}, \frac{n_S r_S}{M} = F,$$

an integer, and there exists a one-to-one mapping $\phi_o$ from the M outlets of G onto the integer set $\{0,1,\ldots,M-1\}$ such that node $\alpha$ in stage S of G is connected to outlet $\beta$ if and only if $$\phi_o(\beta) \epsilon \{(\phi_S(\alpha) \times m_S + o_S)_{mod M} : o_S \epsilon \{0,1,\ldots,m_S-1\}\},$$

where $\phi_S \epsilon C_1$.

Condition 2c $$C_2 \text{ exists}, \frac{n_S r_S}{N} = F,$$

an integer, and there exists a one-to-one mapping $\Psi_o$ from the M outlets of G onto the integer set $\{0,1,\ldots,M-1\}$ such that outlet $\beta$ is connected to node $\alpha$ in stage S of G if and only if $$\psi_S(\alpha) \epsilon \{(\psi_o(\beta) \times F + i_o)_{mod r_S} : i_o \epsilon \{0,1,\ldots,F-1\}\}, \text{ where } \psi_1 \epsilon C_2.$$

Network G with such expanding and concentrating means can be equivalently represented as an S+2 stage perfect shuffle equivalent network comprised of an expansion stage of N 1×F nodes, followed by the S stages of G, followed by a concentration stage of M F'×1 nodes. If Condition 1 (2) holds, $\phi_I(\Psi_I)$ is applied to the N inlet nodes and inlet node $\alpha$ is connected to node $\beta$ in stage 1 of G according to Condition 1e (2e) and $\phi_o(\Psi_o)$ is applied to the M outlet nodes and node $\alpha$ in stage S of G is connected to outlet node $\beta$ according to Condition 1c (2c).

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. A network comprising a plurality of successively interconnected optical node stages each comprising a plurality of optical nodes each having an associated data connection state, wherein each node of at least one of said node stages comprises means for storing control information for controlling the data connection state of at least one node of the node stage following said at least one node stage, and wherein said each node of said at least one node stage and each node of said following node stage has two data inputs, two control inputs, a control output, and a data output, each control input being associated with one data input, said network further comprising means for connecting each data output of said at least one node stage to individual data inputs of two nodes of said following node stage and connecting each control output of said at least one node stage to individual control inputs of two nodes of said following node stage such that each control output of said at least one node stage is usable to selectively enable the transmission of data receivable from one of the data outputs of said at least one node stage through only one of the two nodes of said following node stage that have their data inputs connected to said one data output of said at least one node stage.

2. A network in accordance with claim 1 wherein said storing means is operative to store control information in said at least one node stage in response to receipt of control signals to data inputs of said at least one node stage before the application of data signals to data inputs of said at least one node stage.

3. A network in accordance with claim 1 wherein said each node of said at least one node stage comprises means for performing a logic function the same as or logically equivalent to the function performed by a circuit comprising first and second AND gates and first and second OR gates, having the output of each of said first and second AND gates connected to an input of both of said first and second OR gates, said first AND gate having as inputs one data input of that node and its associated control input, said second AND gate having as inputs the other data input of that node and its associated control input, the output of said first OR gate being connected via a flip-flop as the control output of that node, and the output of said second OR gate being the data output of that node.

4. A network in accordance with claim 3 wherein said performing means comprises a plurality of symmetric self electro-optic effect devices.

5. A network in accordance with claim 3 wherein said performing means comprises first and second symmetric self electro-optic effect devices optically connected via optical crossover interconnect means to third and fourth symmetric self electro-optic effect devices.

6. A network in accordance with claim 3 wherein said connecting means comprises free space optics providing optical crossover interconnections.

7. A network in accordance with claim 1 wherein said means for connecting comprises means permitting each receiving node of said following node stage to receive from a first data output of said at least one node stage a first data input signal, and from a second data output of said at least one node stage a second data input signal; and to receive from a first control output of said at least one node stage a first control input signal, and from a second control output of said at least one node stage a second control input signal, said first and second control input signals being logical complements of each other such that either the first data input signal or the second data input signal, but not both, are transmitted to the data output of said receiving node in accordance with the logical state of the said first control input signal.

8. A network in accordance with claim 7 wherein said connecting means comprises free space optics providing interconnections.

9. A system comprising a plurality of stages of optical nodes, each node having at least two data inputs and at least one output adapted to provide two data outputs, the number of said plurality of node stages being at least three.

a plurality of stages of links, each link stage for connecting the outputs of one of said node stages to the inputs of the successive one of said node stages, said plurality of node stages and said plurality of link stages collectively comprising a perfect shuffle equivalent network, each node of at least one of said node stages comprising means for storing control information for controlling the transmission of data through a succeeding one of said node stages, and means for connecting each of said data outputs from each node of said at least one node stage to individual data inputs of two nodes of said following node stage and connecting the control information from each node of said at least one node stage to inputs of nodes of said following node stage such that the control information is usable to selectively enable transmission of data receivable from said data outputs of said at least one node stage through only one of said two nodes of said following node stage.

10. A system in accordance with claim 9 having N inlets and further comprising means for expanding said N inlets to more than N inputs of the first one of said node stages.

11. A system in accordance with claim 10 wherein said expanding means connects each of said N inlets to multiple inputs of said first node stage in a perfect shuffle sustaining pattern.

12. A system in accordance with claim 9 having M outlets and further comprising means for concentrating more than M outputs of the last one of said node stages to said M outlets.

13. A system in accordance with claim 12 wherein said concentrating means connects multiple outputs of said last node stage to each of said M outlets in a perfect shuffle sustaining pattern.

14. A system in accordance with claim 9 having N inlets and M outlets and further comprising means for expanding said N inlets to more than N inputs of the first one of said node stages, and means for concentrating more than M outputs of the last one of said node stages to said M outlets.

15. A system in accordance with claim 9 wherein the link stage following said at least one node stage connects said stored control information of said each node to two nodes of said succeeding node stage.

16. A system in accordance with claim 9 wherein said link stage following said at least one node stage comprises optical crossover interconnect means.

17. A switching network designed for operating sequentially in a control mode and a data mode, said switching network comprising a plurality of successively interconnected stages each having a plurality of optical nodes input means for receiving during the control mode, at a first of said stages, control signals, input means for receiving during the data mode, at a first of said stages, data signals, interconnection means for propagating said control signals through said stages during the control mode and storing in each node of at least one of said stages a control bit dependent on the control signals received in said each node, and for propagating said data signals through said stages during the data mode, the connection state of each node in each stage other than said first stage being determined by the control bits stored in the preceding stage during the preceding control mode.

18. A switching network as claimed in claim 17 wherein the interconnecting means comprises free space optics wherein each node comprises a plurality of self electro-optic devices, and the means for storing control bits in each node of at least one of said stages comprises one such self electro-optic device in each such node.

* * * * *